US012725466B2

(12) United States Patent
Fox et al.

(10) Patent No.: US 12,725,466 B2
(45) **Date of Patent: *Sep. 1, 2026**

(54) SYSTEMS AND METHODS FOR RESTRICTING THE USE OF A VEHICLE OPERATOR'S TERMINAL

(71) Applicant: Geotab Inc., Oakville (CA)

(72) Inventors: Stephen Michael Fox, Oakville (CA); Jobin Thayilchira, Mississauga (CA)

(73) Assignee: Geotab Inc., Oakville (CA)

( * ) Notice: Subject to any disclaimer, the term of this patent is extended or adjusted under 35 U.S.C. 154(b) by 576 days.

This patent is subject to a terminal disclaimer.

(21) Appl. No.: 17/970,091

(22) Filed: Oct. 20, 2022

(65) Prior Publication Data

US 2023/0137962 A1 May 4, 2023

Related U.S. Application Data

(63) Continuation-in-part of application No. 17/711,118, filed on Apr. 1, 2022, now Pat. No. 11,623,655.

(60) Provisional application No. 63/273,244, filed on Oct. 29, 2021.

(51) Int. Cl.
*G07C 5/08* (2006.01)
*G07C 5/00* (2006.01)

(52) U.S. Cl.
CPC .......... *G07C 5/0808* (2013.01); *G07C 5/008* (2013.01); *G07C 5/0816* (2013.01); *G07C 5/0841* (2013.01)

(58) Field of Classification Search
CPC .... G07C 5/0808; G07C 5/008; G07C 5/0816; G07C 5/0841
See application file for complete search history.

(56) References Cited

U.S. PATENT DOCUMENTS

| | | | |
|---|---|---|---|
| 6,512,465 | B2 | 1/2003 | Flick |
| 6,741,187 | B2 | 5/2004 | Flick |
| 6,744,384 | B2 | 6/2004 | Flick |
| 6,756,885 | B1 | 6/2004 | Flick |
| 6,784,809 | B2 | 8/2004 | Flick |
| 6,798,356 | B2 | 9/2004 | Flick |
| 6,803,861 | B2 | 10/2004 | Flick |

(Continued)

FOREIGN PATENT DOCUMENTS

| | | | |
|---|---|---|---|
| EP | 3005313 | B1 | 5/2023 |
| EP | 3005314 | B1 | 7/2023 |
| WO | 2020181001 | A1 | 9/2020 |

OTHER PUBLICATIONS

Extended European Search Report for European Application No. 22203764.0, mailed Feb. 28, 2023, 7 Pages.

(Continued)

*Primary Examiner* — Luke Huynh
(74) *Attorney, Agent, or Firm* — Sherif A. Abdel-Kader

(57) ABSTRACT

Devices and methods for restricting the use of the operator terminal of an operator of a vehicle are provided. In a method by an operator terminal, the operator terminal determines that the engine of the vehicle is running, determines that the operator is in the driver's seat, and changes the configuration of the operator terminal in response to determining that the engine is running and that the operator is in the driver's seat. The device and method can be used to restrict the use of cellular phones by drivers sitting in a vehicle with the engine running in accordance with laws in certain jurisdictions.

16 Claims, 9 Drawing Sheets

(56) References Cited

U.S. PATENT DOCUMENTS

| | | | |
|---|---|---|---|
| 6,888,495 | B2 | 5/2005 | Flick |
| 6,957,133 | B1 | 10/2005 | Hunt et al. |
| 6,972,667 | B2 | 12/2005 | Flick |
| 7,257,396 | B2 | 8/2007 | Olsen et al. |
| 7,443,284 | B2 | 10/2008 | Curtis |
| 7,561,054 | B2 | 7/2009 | Raz et al. |
| 7,647,147 | B2 | 1/2010 | Fortin et al. |
| 7,659,810 | B2 | 2/2010 | Flick |
| 7,659,811 | B2 | 2/2010 | Flick |
| 7,671,727 | B2 | 3/2010 | Flick |
| 7,821,381 | B2 | 10/2010 | Curtis |
| 7,898,404 | B2 | 3/2011 | Flick |
| 8,032,278 | B2 | 10/2011 | Flick |
| 8,577,703 | B2 | 11/2013 | McClellan et al. |
| 8,731,770 | B2 | 5/2014 | Fischer |
| 8,791,806 | B2 | 7/2014 | Granruth |
| 9,117,246 | B2 | 8/2015 | McClellan |
| 9,129,460 | B2 | 9/2015 | McClellan et al. |
| 9,147,335 | B2 | 9/2015 | Raghunathan et al. |
| 9,349,228 | B2 | 5/2016 | Ochsendorf et al. |
| 9,477,639 | B2 | 10/2016 | Fischer et al. |
| 9,481,373 | B2 | 11/2016 | Basir et al. |
| 9,604,648 | B2 | 3/2017 | Tamari et al. |
| 9,688,283 | B2 | 6/2017 | Armitage et al. |
| 9,754,426 | B2 | 9/2017 | Meyer et al. |
| 9,848,289 | B2 | 12/2017 | Fischer et al. |
| 9,862,315 | B2 | 1/2018 | Hoye |
| 9,886,800 | B2 | 2/2018 | Groß |
| 9,925,987 | B1 | 3/2018 | Nguyen |
| 9,946,531 | B1 * | 4/2018 | Fields .................. A61B 5/6893 |
| 9,984,561 | B1 | 5/2018 | Swafford |
| 10,083,626 | B1 | 9/2018 | Fields et al. |
| 10,231,091 | B2 | 3/2019 | Fischer et al. |
| 10,255,575 | B2 | 4/2019 | Warkentin et al. |
| 10,311,750 | B1 | 6/2019 | Fields et al. |
| 10,380,905 | B2 | 8/2019 | Mohn et al. |
| 10,484,825 | B2 | 11/2019 | Fischer et al. |
| 10,521,983 | B1 | 12/2019 | Hsu-Hoffman et al. |
| 10,748,446 | B1 | 8/2020 | Fields et al. |
| 11,140,236 | B2 | 10/2021 | Davis et al. |
| 11,310,069 | B2 | 4/2022 | Xiao et al. |
| 11,341,786 | B1 | 5/2022 | Calmer et al. |
| 11,365,980 | B1 | 6/2022 | Akhtar et al. |
| 11,542,001 | B1 | 1/2023 | Parodi et al. |
| 11,548,390 | B1 | 1/2023 | Briggs et al. |
| 11,643,102 | B1 | 5/2023 | Calmer et al. |
| 11,688,211 | B1 | 6/2023 | Calmer et al. |
| 11,710,355 | B1 | 7/2023 | Wenneman et al. |
| 11,736,312 | B1 | 8/2023 | Xiao et al. |
| 11,741,760 | B1 | 8/2023 | Dubin et al. |
| 11,749,117 | B1 | 9/2023 | Tsai et al. |
| 11,756,346 | B1 | 9/2023 | Wu et al. |
| 11,780,446 | B1 | 10/2023 | Srinivasan et al. |
| 11,787,413 | B2 | 10/2023 | Tsai et al. |
| 11,801,750 | B2 | 10/2023 | Goenawan et al. |
| 11,842,577 | B1 | 12/2023 | Harrison et al. |
| 11,847,911 | B2 | 12/2023 | Elhattab et al. |
| 2007/0262880 | A1 | 11/2007 | Curtis |
| 2008/0064446 | A1 | 3/2008 | Camp |
| 2011/0034185 | A1 | 2/2011 | Hartmaier |
| 2011/0039581 | A1 | 2/2011 | Cai |
| 2011/0105097 | A1 | 5/2011 | Tadayon |
| 2011/0195699 | A1 * | 8/2011 | Tadayon .................. H04B 5/77 455/418 |
| 2011/0281564 | A1 | 11/2011 | Armitage et al. |
| 2011/0304446 | A1 | 12/2011 | Basson et al. |
| 2012/0015690 | A1 | 1/2012 | Miao |
| 2012/0040665 | A1 | 2/2012 | Liu et al. |
| 2014/0087708 | A1 | 3/2014 | Kalita et al. |
| 2017/0061825 | A1 | 3/2017 | Payne et al. |
| 2017/0140652 | A1 | 5/2017 | Hodges et al. |
| 2018/0124233 | A1 * | 5/2018 | Abramson ............ H04W 12/30 |
| 2018/0182182 | A1 | 6/2018 | Meyer et al. |
| 2018/0300816 | A1 | 10/2018 | Perl et al. |
| 2018/0345983 | A1 | 12/2018 | Lindelöf |
| 2019/0082377 | A1 | 3/2019 | Silver |
| 2019/0156364 | A1 | 5/2019 | Yu |
| 2019/0379683 | A1 * | 12/2019 | Overby ............... H04W 12/122 |
| 2019/0389378 | A1 | 12/2019 | Adams et al. |
| 2020/0130577 | A1 | 4/2020 | Mitra et al. |
| 2020/0228646 | A1 | 7/2020 | Hotes et al. |
| 2020/0317216 | A1 * | 10/2020 | Konrardy ............ B60W 30/182 |
| 2020/0334762 | A1 | 10/2020 | Carver et al. |
| 2022/0014601 | A1 | 1/2022 | Davis et al. |
| 2022/0041169 | A1 | 2/2022 | Krishna et al. |
| 2022/0044500 | A1 | 2/2022 | Yang et al. |
| 2022/0198497 | A1 | 6/2022 | Cote et al. |
| 2022/0237958 | A1 | 7/2022 | Tzamaloukas et al. |
| 2023/0171314 | A1 | 6/2023 | Onti Srinivasan et al. |
| 2023/0219592 | A1 | 7/2023 | Calmer et al. |
| 2023/0298410 | A1 | 9/2023 | Calmer et al. |

OTHER PUBLICATIONS

Extended European Search Report for European Application No. 22203997.6, mailed Feb. 28, 2023, 7 Pages.

* cited by examiner

SYSTEMS AND METHODS FOR RESTRICTING THE USE OF A VEHICLE OPERATOR'S TERMINAL

RELATED APPLICATIONS

The present application claims priority from U.S. provisional application No. 63/273,244 filed on Oct. 29, 2021, the contents of which are herein incorporated by reference. The present application is also a continuation-in-part of U.S. patent application Ser. No. 17/711,118 filed on Apr. 1, 2022, the contents of which are herein incorporated by reference.

FIELD

The present disclosure relates generally to electronic device management, and more specifically to a method and a device for restricting the use of a vehicle operator's terminal.

BACKGROUND

A telematics system may gather asset data using a telematics device. The telematics device may be integrated into or located onboard the asset. The asset may be a vehicle ("vehicular asset") or some stationary equipment. The telematics device may collect the asset data from the asset through a data connection with the asset. In the case of a vehicular asset, the telematics device may gather the asset data through an onboard diagnostic port (OBD). The gathered asset data may include engine revolutions-per-minute (RPM), battery voltage, fuel level, tire pressure, engine coolant temperature, or any other asset data available through the diagnostic port. Additionally, the telematics device may gather sensor data pertaining to the asset via sensors on the telematics device. For example, the telematics device may have temperature and pressure sensors, inertial measurement units (IMU), optical sensors, and the like. Furthermore, the telematics device may gather location data pertaining to the asset from a location module on the telematics device. When the telematics device is coupled to the asset, the gathered sensor data and location data pertain to the asset. The gathered asset data, sensor data and location data may be received and recorded by a technical infrastructure of the telematics system, such as a telematics server, and used in the provision of fleet management tools, for telematics services, or for further data analysis.

SUMMARY

In one aspect of the present disclosure, there is provided a method by an operator terminal of an operator registered to operate a vehicle. The method comprises determining that an engine of the vehicle is running, determining that the operator is in a driver's seat of the vehicle, and changing a configuration of the operator terminal in response to determining that the engine is running and determining that the operator is in the driver's seat.

Determining that the engine is running may comprise receiving an indication from a telematics device coupled to the vehicle that the engine of the vehicle is running.

Receiving the indication from the telematics device may be over a short-range wireless communication connection between the operator terminal and the telematics device.

Receiving the indication from the telematics device may be over a short-range wireless communication connection between the operator terminal and an input/output expander coupled to the telematics device.

Determining that the operator is in the driver's seat may be based on hours of service received by a user interface of a driver telematics application running on the operator terminal.

Determining that the operator is in the driver's seat may comprise receiving from a telematics device coupled to the vehicle a location of the vehicle, determining that a location of the operator terminal is in close proximity to the location of the vehicle, and determining that the operator terminal is generally stationary.

Determining that the location of the operator terminal is in close proximity to the location of the vehicle may comprise computing a distance between the location of the operator terminal and the location of the vehicle and determining that the distance is below a predetermined threshold.

Determining that the location of the operator terminal is in close proximity to the location of the vehicle may comprise receiving an indication from the telematics device of a near-field communications (NFC) tap by a tag of the operator within a prior period of time.

Determining that the operator terminal is generally stationary may comprise determining that inertial motion unit (IMU) data from an IMU of the operator terminal is below a particular threshold.

Determining that the operator is in the driver's seat may comprise receiving an indication from a telematics device coupled to the vehicle that a driver's seatbelt is fastened.

Determining that the operator is in the driver's seat may comprise receiving an indication from a telematics device coupled to the vehicle that that an occupancy sensor has detected that the driver's seat is occupied.

Determining that the operator is in the driver's seat may comprise receiving an indication from a telematics device coupled to the vehicle that that a steering wheel of the vehicle was touched within a prior period of time.

Determining that the operator is in the driver's seat may comprise receiving an indication from a telematics device coupled to the vehicle that that a steering wheel of the vehicle was touched for at least a particular length of time.

Changing the configuration of the operator terminal may comprise disabling at least one feature of the operator terminal.

Disabling at least one feature of the operator terminal may comprise disabling all features of the operator terminal except for an ability to make an emergency call.

Disabling at least one feature of the operator terminal may comprise locking a user interface input device thereof.

Disabling at least one feature of the operator terminal may comprise disabling certain applications from running.

In another aspect of the present disclosure, there is provided an operator terminal of an operator registered to operate a vehicle. The operator terminal comprises a controller, an inertial measurement unit (IMU) coupled to the controller, a short-range communications module coupled to the controller, and a memory coupled to the controller. The memory stores machine-executable programming instructions which, when executed by the controller, configure the operator terminal to determine that an engine of the vehicle is running, determine that the operator is in a driver's seat of the vehicle, and change a configuration of the operator terminal in response to determining that the engine is running and determining that the operator is in the driver's seat.

The machine-executable programming instructions which configure the operator terminal to determine that the operator is in the driver's seat may comprise machine-executable programming instructions which configure the operator terminal to receive from a telematics device coupled to the vehicle a location of the vehicle, determine that a location of the operator terminal provided by the location module is in close proximity to the location of the vehicle, determine that the operator terminal is generally stationary.

The machine-executable programming instructions which change the configuration of the operator terminal may comprise machine-executable programming instructions which disable at least one feature of the operator terminal.

In another aspect of the present disclosure, there is provided a method. The method includes sending telematics data to a telematics server by a telematics device coupled to a vehicle determining by the telematics server based on the telematics data that a vehicle's engine of the vehicle is running, determining by the telematics server based on the telematics data that a vehicle operator registered with the vehicle is in a driver's seat of the vehicle, sending by the telematics server a message over a network to an operator terminal of the vehicle operator for changing a configuration of the operator terminal in response to determining that the vehicle's engine is running and determining that the vehicle operator is in the driver's seat of the vehicle, receiving by the operator terminal the message for changing the configuration of the operator terminal, changing by the operator terminal the configuration of the operator terminal in response to receiving the message for changing the configuration.

Determining that the vehicle operator registered with the vehicle is in the driver's seat may comprise determining that a current time is within hours of service (HOS) of the vehicle operator and determining that the operator terminal is generally stationary.

Determining that the vehicle operator registered with the vehicle is in the driver's seat may comprise determining that a current time is within hours of service (HOS) of the vehicle operator and receiving, from the telematics device coupled to the vehicle, an indication that a driver's seatbelt is fastened.

Determining that the vehicle operator registered with the vehicle is in the driver's seat may comprise determining that a location of the operator terminal is in close proximity to the location of the vehicle, receiving inertial motion unit (IMU) data from the operator terminal, and determining that the IMU data is below a particular threshold.

Determining that the vehicle operator registered with the vehicle is in the driver's seat may comprise determining that a location of the operator terminal is in close proximity to the location of the vehicle, receiving inertial motion unit (IMU) data from the operator terminal, and determining that the IMU data does not match a pattern indicative that the vehicle operator is inspecting the vehicle.

Determining that the location of the operator terminal is in close proximity to the location of the vehicle may comprise receiving the location of the operator terminal from the operator terminal, receiving the location of the vehicle from the telematics device deployed in the vehicle, and determining that a distance between the location of the operator terminal and the location of the vehicle is less than a distance threshold.

Determining that the location of the operator terminal is in close proximity to the location of the vehicle may comprise receiving an indication from the operator terminal that the operator terminal is connected to the vehicle via a short-range communications connection.

Determining that the location of the operator terminal is in close proximity to the location of the vehicle may comprise receiving an indication from the operator terminal that the operator terminal is connected to the telematics device coupled to the vehicle via a short-range communications connection.

Determining that the location of the operator terminal is in close proximity to the location of the vehicle may comprise receiving an indication from the telematics device of a near-field communications (NFC) tap by a tag of the vehicle operator within a prior period of time.

Changing the configuration of the operator terminal may comprise disabling all features except for an ability to make an emergency call.

Changing the configuration of the operator terminal may comprise locking a user interface input device of the operator terminal.

Sending, by the telematics server, the message to the operator terminal for changing the configuration of the operator terminal may be done when a location of the vehicle is outside at least one predetermined geofence.

Sending, by the telematics server, the message to the operator terminal for changing the configuration of the operator terminal may be done when an image indication received from the vehicle indicates that the vehicle is not at a particular type of location.

Sending, by the telematics server, the message to the operator terminal for changing the configuration of the operator terminal may be done after a grace period since cranking of the vehicle's engine has expired.

In another aspect of the present disclosure, there is provided a telematics server including a telematics server, a network, a telematics device coupled to a vehicle and in communication with the telematics server over the network, and an operator terminal in communication with the telematics server over the network. The telematics device sends telematics data to the telematics server, the telematics server determines based on the telematics data that a vehicle's engine of the vehicle is running, and the telematics server determines based on the telematics data that a vehicle operator registered with the vehicle is in a driver's seat of the vehicle. The telematics server sends a message over the network to the operator terminal of the vehicle operator for changing a configuration of the operator terminal in response to determining that the vehicle's engine is running and determining that the vehicle operator is in the driver's seat of the vehicle, the operator terminal receives the message for changing the configuration of the operator terminal, and the operator terminal changes the configuration thereof in response to receiving the message for changing the configuration.

The operator terminal may change the configuration thereof to disable all features except for an ability to make an emergency call.

The operator terminal may change the configuration thereof to lock a user interface input device thereof.

The telematics server may send the message for changing the configuration of the operator terminal when a location of the vehicle is outside at least one predetermined geofence.

The telematics server may send the message for changing the configuration of the operator terminal when an image indication received from the vehicle indicates that the vehicle is not at a particular type of location.

The telematics server may send the message for changing the configuration of the operator terminal after a grace period since cranking of the vehicle's engine has expired.

In another aspect of the present disclosure there is provided a method by a telematics server. The method includes determining that a vehicle's engine in a vehicle is running, determining that a vehicle operator registered with the vehicle is in a driver's seat of the vehicle, and sending a message to an electronic device of the vehicle operator disabling at least one feature of the electronic device in response to determining that the vehicle's engine is running and determining that the vehicle operator is in the driver's seat of the vehicle.

Determining that the vehicle's engine is running may comprise receiving an indication that the vehicle's engine is running from a telematics device deployed in the vehicle.

The indication may comprise a revolutions-per-minute (RPM) which is greater than zero or a signal indicating that an Electric Vehicle (EV) is active.

Determining that the vehicle operator registered with the vehicle is in the driver's seat may comprise determining that a current time is within hours of service (HOS) of the vehicle operator and determining that the electronic device of the vehicle operator is generally stationary.

Determining that the vehicle operator registered with the vehicle is in the driver's seat may comprise determining that a current time is within hours of service (HOS) of the vehicle operator and detecting a presence of an occupant in a driver's seat of the vehicle.

Detecting a presence of an occupant in a driver's seat of the vehicle may comprise receiving, from a telematics device coupled to the vehicle, an indication that a driver's seatbelt is fastened.

Detecting a presence of an occupant in a driver's seat of the vehicle may comprise receiving, from a telematics device coupled to the vehicle, an indication of a recent interaction with a steering wheel of the vehicle.

Determining that a vehicle operator registered with the vehicle is in a driver's seat of the vehicle may comprise receiving, from a telematics device coupled to the vehicle, an indication that a dashboard camera has captured an image of vehicle operator registered with the vehicle.

Determining that a vehicle operator registered with the vehicle is in a driver's seat of the vehicle may comprise receiving, from a telematics device coupled to the vehicle, an indication that a fingerprint sensor disposed on a steering wheel of the vehicle can detect a fingerprint of the vehicle operator registered with the vehicle.

Determining that the vehicle operator registered with the vehicle is in the driver's seat may comprise determining that a location of the electronic device of the vehicle operator is in close proximity to a location of the vehicle and determining that the electronic device of the vehicle operator is generally stationary.

Determining that the electronic device of the vehicle operator is generally stationary may comprise receiving inertial motion unit (IMU) data from the electronic device and determining that the IMU data is below a particular threshold. The IMU data may comprise accelerometer data.

Determining that the electronic device of the vehicle operator is generally stationary may comprise receiving inertial motion unit (IMU) data from the electronic device and determining that the IMU data does not match a pattern indicative that the vehicle operator is inspecting the vehicle.

Determining that the IMU data does not match a pattern indicative that the vehicle operator is inspecting the vehicle may involve providing the IMU data to a machine learning model Determining that the location of the electronic device of the vehicle operator is in close proximity to the location of the vehicle may comprise receiving the location of the electronic device from the electronic device; receiving the location of the vehicle from a telematics device deployed in the vehicle and determining that a distance between the location of the electronic device and the location of the vehicle is less than a particular threshold.

Determining that the location of the electronic device of the vehicle operator is in close proximity to the location of the vehicle comprises receiving an indication from the electronic device of the vehicle operator that the electronic device of the vehicle operator is connected to the vehicle via a short-range communications connection.

Determining that the location of the electronic device of the vehicle operator is in close proximity to the location of the vehicle may comprise receiving an indication from the electronic device of the vehicle operator that the electronic device of the vehicle operator is connected to a telematics device coupled to the vehicle via a short-range communications connection.

The short-range communications connection may comprise a Bluetooth connection.

Determining that the location of the electronic device of the vehicle operator is in close proximity to the location of the vehicle may comprise receiving an indication from a telematics device of a near-field communications (NFC) tap by a tag of the vehicle operator within a prior period of time Sending a message to an electronic device of the vehicle operator restricting at least one feature of the electronic device may comprise sending a message which causes the electronic device of the vehicle operator to disable all features except for an ability to make an emergency call.

Sending a message to an electronic device of the vehicle operator restricting at least one feature of the electronic device comprises sending a message which causes the electronic device of the vehicle operator to securely lock the electronic device.

Sending a message to an electronic device of the vehicle operator restricting at least one feature of the electronic device may be done when a location of the vehicle is outside at least one predetermined geofence.

Sending a message to an electronic device of the vehicle operator restricting at least one feature of the electronic device may be done when an image indication received from the vehicle indicates that the vehicle is not at a particular type of location.

The image indication may comprise an image received from a dashboard camera.

Sending a message to an electronic device of the vehicle operator restricting at least one feature of the electronic device may be done after a grace period since cranking of the vehicle's engine has expired.

The grace period may expire in response to detecting motion of the vehicle.

Sending a message to an electronic device of the vehicle operator restricting at least one feature of the electronic device may be done when a particular mode is enabled for the vehicle.

In another aspect of the present disclosure, there is provided a telematics server comprising a controller, a network interface coupled to the controller, and a memory coupled to the controller. The memory stores machine-executable instructions which when executed by the controller configure the telematics server to determine that a vehicle's engine of a vehicle is running, determine that a vehicle operator registered with the vehicle is in a driver's seat of the vehicle, and send a message to an electronic device of the vehicle operator, the message restricting at least one feature of the electronic device in response to determining that the vehicle's engine is running and determining that the vehicle operator is in the driver's seat of the vehicle.

In yet another aspect of the present disclosure, there is provided a method by an electronic device. The method comprises determining that a vehicle's engine of a vehicle is running, determining that a vehicle operator registered with the vehicle is in a driver's seat of the vehicle, and disabling at least one feature of the electronic device in response to determining that the vehicle's engine is running and determining that the vehicle operator is in the driver's seat of the vehicle.

Determining that the vehicle's engine is running may comprise receiving, over a short-range communications connection from a telematics device deployed in the vehicle an indication that the vehicle's engine is running.

The indication comprises a revolutions-per-minute (RPM) which is greater than zero.

Determining that the vehicle operator registered with the vehicle is in the driver's seat may comprise determining that a current time is within hours of service (HOS) of the vehicle operator and determining that the electronic device of the vehicle operator is generally stationary.

Determining that the vehicle operator registered with the vehicle is in the driver's seat may comprise determining that a current time is within hours of service (HOS) of the vehicle operator and detecting a presence of an occupant in a driver's seat of the vehicle.

Detecting a presence of an occupant in a driver's seat of the vehicle may comprise receiving, from a telematics device coupled to the vehicle, an indication that a driver's seatbelt is fastened.

Determining that the vehicle operator registered with the vehicle is in the driver's seat may comprise determining that a location of the electronic device of the vehicle operator is in close proximity to a location of the vehicle and determining that the electronic device of the vehicle operator is generally stationary.

Determining that the electronic device of the vehicle operator is generally stationary may comprise receiving inertial measurement unit (IMU) data from IMU sensors in the electronic device and determining that the electronic device of the vehicle operator is generally stationary if the IMU data is below a particular threshold.

Determining that the location of the electronic device of the vehicle operator is in close proximity to the location of the vehicle may comprise determining that the electronic device of the vehicle operator is connected to the vehicle via a short-range communications connection.

Determining that the location of the electronic device of the vehicle operator is in close proximity to the location of the vehicle may comprise determining that the electronic device of the vehicle operator is connected to a telematics device coupled to the vehicle via a short-range communications connection.

Determining that the location of the electronic device of the vehicle operator is in close proximity to the location of the vehicle may comprise determining that the electronic device of the vehicle operator is connected, via a short-range communications connection to an I/O expansion adapter coupled to a telematics device which is coupled to the vehicle.

The short-range communications connection may comprise a Bluetooth connection.

Disabling at least one feature of the electronic device may comprise disabling all features of the electronic device except for an ability to make an emergency call.

Disabling at least one feature of the electronic device comprises securely locking the electronic device.

In a further aspect of the present disclosure, there is provided an electronic device comprising a controller, a network interface coupled to the controller, and a memory coupled to the controller. The memory stores machine-executable programming instructions which when executed by the controller, configure the electronic device to determine that a vehicle's engine is running, determine that a vehicle operator registered with the vehicle is in a driver's seat of the vehicle, and disable at least one feature of the electronic device in response to determining that the vehicle's engine is running and determining that the vehicle operator is in the driver's seat of the vehicle

BRIEF DESCRIPTION OF THE DRAWINGS

Exemplary non-limiting embodiments of the present invention are described with reference to the accompanying drawings in which.

DETAILED DESCRIPTION

Telematics System

Figure 1:
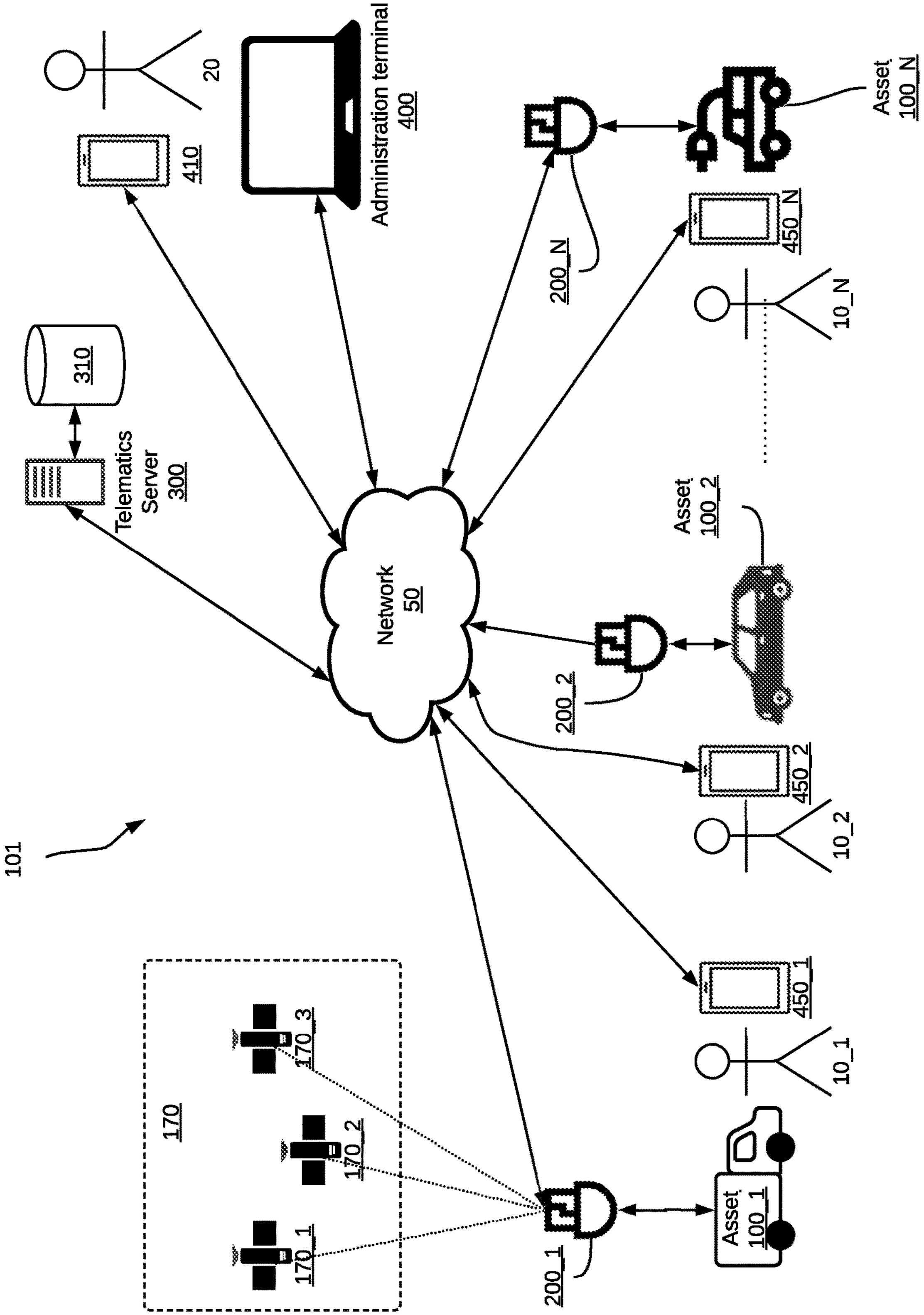
FIG. 1 is a schematic diagram of a telematics system including a plurality of telematics devices coupled to a plurality of assets.

A large telematics system may collect data from a high number of assets, either directly or through telematic devices. A telematics device may refer to a self-contained device installed at an asset, or a telematics device that is integrated into the asset itself. In either case, it may be said that telematics data is being captured or gathered by the telematics device. FIG. 1 shows a high-level block diagram of a telematics system 101. The telematics system 101 includes a telematics server 300, (N) telematics devices shown as telematics device 200_1, telematics device 200_2 . . . through telematics device 200_N ("telematics device 200"), a network 50, administration terminals 410 and 410, and operator terminals 450_1, 450_2 . . . through

450_N ("operator terminals 450"). FIG. 1 also shows a plurality of (N) assets named as asset 100_1, asset 100_2 . . . asset 100_N ("asset 100") coupled to the telematics device 200_1, telematics device 200_2 . . . telematics device 200_N, respectively. Additionally, FIG. 1 shows a plurality of satellites 170_1, 170_2 and 170_3 ("satellites 170") in communication with the telematics devices 200 for facilitating navigation.

The assets 100 shown are in the form of vehicles. For example, the asset 100_1 is shown as a truck, which may be part of a fleet that delivers goods or provides services. The asset 100_2 is shown as a passenger car that typically runs on an internal combustion engine (ICE). The asset 100_3 is shown as an electric vehicle (EV). Other types of vehicles, which are not shown, are also contemplated in the various embodiments of the present disclosure, including but not limited to, farming vehicles, construction vehicles, military vehicles, and the like.

The telematics devices 200 are electronic devices which are coupled to assets 100 and configured to capture asset data from the assets 100. For example, in FIG. 1 the telematics device 200_1 is coupled to the asset 100_1. Similarly, the telematics device 200_2 is coupled to the asset 100_2 and the telematics device 200_3 is coupled to the asset 100_3. The components of a telematics device 200 are explained in further detail with reference to FIG. 2A.

The network 50 may be a single network or a combination of networks such as a data cellular network, the Internet, and other network technologies. The network 50 may provide connectivity between the telematics devices 200 and the telematics server 300, between the administration terminal 400 and the telematics server 300, between the handheld administration terminal 410 and the telematics server 300, and between the operator terminals 450 and the telematics server 300.

The telematics server 300 is an electronic device executing machine-executable programming instructions which enable the telematics server 300 to store and analyze telematics data. The telematics server 300 may be a single computer system or a cluster of computers. The telematics server 300 may be running an operating system such as Linux, Windows, Unix, or any other equivalent operating system. Alternatively, the telematics server 300 may be a software component hosted on a cloud service, such as Amazon Web Service (AWS). The telematics server 300 is connected to the network 50 and may receive telematics data from the telematics devices 200. The telematics server 300 may have a plurality of software modules for performing data analysis and analytics on the telematics data to obtain useful asset information about the assets 100. The telematics server 300 may be coupled to a telematics database 310 for storing telematics data and/or the results of the analytics which are related to the assets 100. The asset information stored may include operator information about the operators 10 corresponding to the assets. The telematics server 300 may communicate the asset data and/or the operator information pertaining to an asset 100 to one or more of: the administration terminal 400, the handheld administration terminal 410, and the operator terminal 450.

The satellites 170 may be part of a global navigation satellite system (GNSS) and may provide location information to the telematics devices 200. The location information may be processed by a location module on the telematics device 200 to provide location data indicating the location of the telematics device 200 (and hence the location of the asset 100 coupled thereto). A telematics device 200 that can periodically report an asset's location is often termed an "asset tracking device".

The administration terminal 400 is an electronic device, which may be used to connect to the telematics server 300 to retrieve data and analytics related to one or more assets 100 or to issue commands to one or more telematics device 200 via the telematics server 300. The administration terminal 400 may be a desktop computer, a laptop computer such as the administration terminal 400, a tablet (not shown), or a smartphone such as the handheld administration terminal 410. The administration terminal 400 may run a web browser or a custom application which allows retrieving data and analytics, pertaining to one or more assets 100, from the telematics server 300 via a web interface of the telematics server 300. The handheld administration terminal 410 may run a mobile application for communicating with the telematics server 300, the mobile application allowing retrieving data and analytics therefrom. The mobile application of the handheld administration terminal may also be used to issue commands to one or more telematics device 200 via the telematics server 300. A fleet manager 20 may communicate with the telematics server 300 using the administration terminal 400, the handheld administration terminal 410, or another form of administration terminals such as a tablet. In addition to retrieving data and analytics, the administration terminal 400 allows the fleet manager 20 to set alerts and geofences for keeping track of the assets 100, receiving notifications of deliveries, and so on.

The operator terminals 450 are electronic devices, such as smartphones or tablets. The operator terminals 450 are used by operators 10 (for example, vehicle drivers) of the assets 100 to both track and configure the usage of the assets 100. For example, as shown in FIG. 1, the operator 10_1 has the operator terminal 450_1, the operator 10_2 has the operator terminal 450_2, and the operator 10_N has the operator terminal 450_N. Assuming the operators 10 all belong to a fleet of vehicles, each of the operators 10 may operate any of the assets 100. For example, FIG. 1 shows that the operator 10_1 is associated with the asset 100_1, the operator 10_2 is associated with the asset 100_2, and the operator 10_N is associated with the asset 100_N. However, any operator 10 may operate any asset 100 within a particular group of assets, such as a fleet. The operator terminals 450 are in communication with the telematics server 300 over the network 50. The operator terminals 450 may run at least one asset configuration application. The asset configuration application may be used by an operator 10 to inform the telematics server 300 that the asset 100 is being currently operated by the operator 10. For example, the operator 10_2 may use an asset configuration application on the operator terminal 450_2 to indicate that the operator 10_2 is currently using the asset 100_2. The telematics server 300 updates the telematics database 310 to indicate that the asset 100_2 is currently associated with the operator 10_2. Additionally, the asset configuration application may be used to report information related to the operation duration of the vehicle, the number of stops made by the operator during their working shift, and so on. Furthermore, the asset configuration application may allow the operator to configure the telematics device 200 coupled to the asset 100 that the operator 10 is operating.

In operation, a telematics device 200 is coupled to an asset 100 to capture asset data. The asset data may be combined with location data obtained by the telematics device 200 from a location module in communication with the satellites 170 and/or sensor data gathered from sensors in the telematics device 200 or another device coupled to the telematics device 200. The combined asset data, location data, and sensor data may be termed “telematics data”. The telematics device 200 sends the telematics data, to the telematics server 300 over the network 50. The telematics server 300 may process, aggregate, and analyze the telematics data to generate asset information pertaining to the assets 100 or to a fleet of assets. The telematics server 300 may store the telematics data and/or the generated asset information in the telematics database 310. The administration terminal 400 may connect to the telematics server 300, over the network 50, to access the generated asset information. Alternatively, the telematics server 300 may push the generated asset information to the administration terminal 400. Additionally, the operators 10, using their operator terminals 450, may indicate to the telematics server 300 which assets 100 they are associated with. The telematics server 300 updates the telematics database 310 accordingly to associate the operator 10 with the asset 100. Furthermore, the telematics server 300 may provide additional analytics related to the operators 10 including work time, location, and operating parameters. For example, for vehicle assets, the telematics data may include turning, speeding, and braking information. The telematics server 300 can correlate the telematics data to the vehicle’s driver by querying the asset database 310. A fleet manager 20 may use the administration terminal 400 to set alerts for certain activities pertaining to the assets 100. When criteria for an alert is met, the telematics server 300 sends a message to the fleet manager’s administration terminal 400, and may optionally send alerts to the operator terminal 450 to notify an operator 10 of the alert. For example, a vehicle driver operating the vehicle outside of a service area or hours of service may receive an alert on their operator terminal 450. A fleet manager 20 may also the administration terminal 400 to configure a telematics device 200 by issuing commands thereto via the telematics server 300.

Telematics Device

Figure 2A:
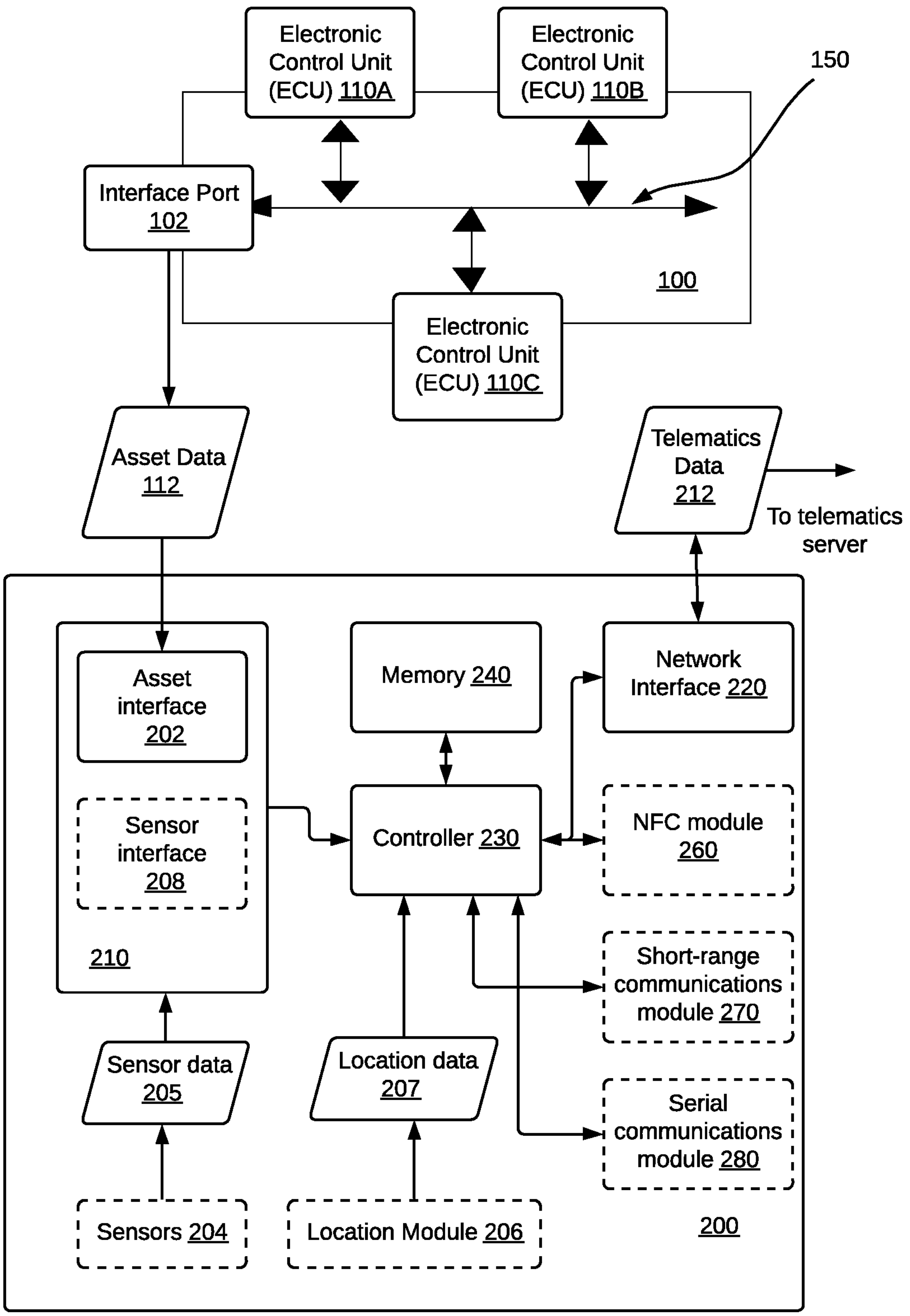
FIG. 2A is a block diagram showing a telematics device coupled to an asset.

Further details relating to the telematics device 200 and how it interfaces with an asset 100 are shown with reference to FIG. 2A. FIG. 2A depicts an asset 100 and a telematics device 200 coupled thereto. Selected relevant components of each of the asset 100 and the telematics device 200 are shown.

The asset 100 may have a plurality of electronic control units (ECUs). An ECU is an electronic module which interfaces with one or more sensors for gathering information from the asset 100. For example, an oil temperature ECU may contain a temperature sensor and a controller for converting the measured temperature into digital data representative of the oil temperature. Similarly, a battery voltage ECU may contain a voltage sensor for measuring the voltage at the positive battery terminal and a controller for converting the measured voltage into digital data representative of the battery voltage. A vehicle may, for example, have around seventy ECUs. For simplicity, only a few of the ECUs 110 are depicted in FIG. 2A. For example, in the depicted embodiment the asset 100 has three electronic control units: ECU 110A, ECU 1106, and ECU 110C (“ECUs 110”). The ECU 110A, the ECU 1106, and the ECU 110C are shown to be interconnected via an asset communications bus, such as a Controller Area Network (CAN) bus 150. ECUs 110 interconnected using the CAN bus 150 send and receive information to one another in CAN data frames by placing the information on the CAN bus 150. When an ECU places information on the CAN bus 150, other ECUs 110 receive the information and may or may not consume or use that information. Different protocols may be used to exchange information between the ECUs over a CAN bus. For example, ECUs 110 in trucks and heavy vehicles use the Society of Automotive Engineering (SAE) J1939 protocol to exchange information over a CAN bus 150. Most passenger vehicles use the SAE J1979 protocol, which is commonly known as On-Board Diagnostic (OBD) protocol to exchange information between ECUs 110 on their CAN bus 150. In industrial automation, ECUs use a CANOpen protocol to exchange information over a CAN bus 150. An asset 100 may allow access to information exchanged over the CAN bus 150 via an interface port 102. For example, if the asset 100 is a passenger car, then the interface port 102 is most likely an OBD-II port. Data accessible through the interface port 102 is termed the asset data 112. In some embodiments, the interface port 102 includes a power interface for providing electric power to a telematics device 200 connected thereto.

The telematics device 200 includes a controller 230 coupled to a memory 240, an interface layer 210 and a network interface 220. The telematics device 200 also includes one or more sensors 204 and a location module 206 coupled to the interface layer 210. The telematics device 200 may also contain some optional components, shown in dashed lines in FIG. 2A. For example, the telematics device 200 may contain one or more of: a near-field communications (NFC) module such as NFC module 260, a short-range wireless communications module 270, and a wired communications module such as a serial communications module 280. In some embodiments (not shown), the telematics device 200 may have a dedicated power source or a battery. In other embodiments, the telematics device 200 may receive power directly from the asset 100, via the interface port 102. The telematics device 200 shown is an example. Some of the components shown in solid lines may also be optional and may be implemented in separate modules. For example, some telematics devices (not shown) may not have a location module 206 and may rely on an external location module for obtaining the location data 207. Some telematics devices may not have any sensors 204 and may rely on external sensors for obtaining sensor data 205.

The controller 230 may include one or any combination of a processor, microprocessor, microcontroller (MCU), central processing unit (CPU), processing core, state machine, logic gate array, application-specific integrated circuit (ASIC), field-programmable gate array (FPGA), or similar, capable of executing, whether by software, hardware, firmware, or a combination of such, the actions performed by the controller 230 as described herein. The controller 230 may have an internal memory for storing machine-executable programming instructions to carry out the methods described herein.

The memory 240 may include read-only-memory (ROM), random access memory (RAM), flash memory, magnetic storage, optical storage, and similar, or any combination thereof, for storing machine-executable programming instructions and data to support the functionality described herein. The memory 240 is coupled to the controller 230 thus enabling the controller 230 to execute the machine-executable programming instructions stored in the memory 240 and to access the data stored therein. The memory 240 may contain machine-executable programming instructions, which when executed by the controller 230, configures the telematics device 200 for receiving asset data 112 from the asset 100 via the asset interface 202, and for receiving sensor data 205 from the sensors 204 and/or location data 207 from the location module 206 via the sensor interface 208. The memory 240 may also contain machine-executable programming instructions for combining asset data 112, sensor data 205 and location data 207 into telematics data 212. Additionally, the memory 240 may further contain instructions which, when executed by the controller 230, configures the telematics device 200 to transmit the telematics data 212 via the network interface 220 to a telematics server 300 over a network 50. In some embodiments, the memory 240 only stores data, and the machine-executable programming instructions for carrying out the aforementioned tasks are stored in an internal memory of the controller 230.

The location module 206 may be a global positioning system (GPS) transceiver or another type of location determination peripheral that may use, for example, wireless network information for location determination. The location module 206 is coupled to the controller 230 and provides location data 207 thereto. The location data 207 may be in the form of a latitude and longitude, for example.

The sensors 204 may be one or more of: a temperature sensor, a pressure sensor, an optical sensor, a motion sensor such as an accelerometer, a gyroscope, or any other suitable sensor indicating a condition pertaining to the asset 100 to which the telematics device 200 is coupled. The sensors provide sensor data 205 to the controller 230 via the sensor interface 208.

The interface layer 210 may include a sensor interface 208 and an asset interface 202. The sensor interface 208 is configured for receiving the sensor data 205 from the sensors 204. For example, the sensor interface 208 interfaces with the sensors 204 and receives the sensor data 205 therefrom. The asset interface 202 receives asset data 112 from the asset 100. In the depicted embodiment, the asset interface 202 is coupled to the interface port 102 of the asset 100. The asset data 112, received at the telematics device 200, from the asset 100 may be in the form of data messages, such as CAN data frames. The asset data 112 may describe one or more of any of: a property, a state, and an operating condition of the asset 100. For example, where the asset 100 is a vehicle, the data may describe the speed at which the vehicle is travelling, a state of the vehicle (off, idle, or running), or an engine operating condition (e.g., engine oil temperature, engine revolutions-per-minutes (RPM), or a battery voltage). In addition to receiving the asset data 112, in some embodiments the asset interface 202 may also receive power from the asset 100 via the interface port 102. The interface layer 210 is coupled to the controller 230 and provides both the asset data 112 and the sensor data 205 to the controller 230.

The network interface 220 may include a cellular modem, such as an LTE-M modem, CAT-M modem, other cellular modem, Wi-Fi modem, or any other communication device configured for communication via the network 50 with which to communicate with the telematics server 300. The network interface 220 may be used to transmit telematics data 212 obtained from the asset 100 to the telematics server 300 for a telematics service or other purposes. The network interface 220 may also be used to receive instructions from the telematics server 300 for configuring the telematics device 200 in a certain mode and/or requesting a particular type of the asset data 112 from the asset 100.

The NFC module 260 may be an NFC reader which can read information stored on an NFC tag. The NFC module 260 may be used to confirm the identity of the operator 10 by having the operator 10 tap an NFC tag onto the telematics device 200 such that the NFC tag is read by the NFC module 260. The information read from the NFC tag may be included in the telematics data 212 sent by the telematics device 200 to the telematics server 300.

The short-range wireless communications module 270 is a component intended for providing short-range wireless communication capability to the telematics device 200. The short-range wireless communications module 270 may be a Bluetooth™ wireless fidelity (Wi-Fi), Zigbee™, or any other short-range wireless communications module. The short-range wireless communications module 270 allows other devices to communicate with the telematics device 200 over a short-range wireless network.

The serial communications module 280 is an example of a wired communications module. The serial communications module 280 is an electronic peripheral for providing serial wired communications to the telematics device 200. For example, the serial communications module 280 may include a universal asynchronous receiver transmitter (UART) providing serial communications per the RS-232 protocol. Alternatively, the serial communications module 280 may be a serial peripheral interface (SPI) bus, or an inter-integrated circuit (I2C) bus. As another example, the serial communications module 280 may be a universal serial bus (USB) transceiver.

In operation, an ECU 110, such as the ECU 110A, the ECU 110B, or the ECU 110C communicates asset data over the CAN bus 150. The asset data exchanged, between the ECUs 110, over the CAN bus 150 are accessible via the interface port 102 and may be retrieved as the asset data 112 by the telematics device 200. The controller 230 of the telematics device 200 receives the asset data 112 via the asset interface 202. The controller 230 may also receive sensor data 205 from the sensors 204 over the sensor interface 208. Furthermore, the controller 230 may receive location data 207 from the location module 206. The controller 230 combines the asset data 112 with the sensor data 205 and the location data 207 to obtain the telematics data 212. The controller 230 transmits the telematics data 212 to the telematics server 300 over the network 50 via the network interface 220. Optionally, an operator 10 may tap an NFC tag to the NFC module 260 to identify themself as the operator 10 of the asset 100. Additionally, an external peripheral, such as a GPS receiver, may connect with the telematics device 200 via the short-range wireless communications module 270 or the serial communications module 280 for providing location information thereto. In some embodiments, the telematics device 200 may receive, via the network interface 220, commands from the telematics server 300. The received commands instruct the telematics device 200 to be configured in a particular way. For example, the received commands may configure the way in which the telematics device gathers asset data 112 from the asset 100 as will be described in further detail below.

The telematics data 212 which is comprised of asset data 112 gathered from the asset 100 combined with the sensor data 205 and the location data 207 may be used to derive useful data and analytics, by the telematics server 300. However, there are times when additional data, which is not provided by the asset 100, the sensors 204 or the location module 206 may be needed. The telematics device 200 may have a limited number of sensors 204 such as accelerometers or gyroscopes providing limited information about the motion of the asset 100 on which the telematics device 200 is deployed. The location module 206 may provide location and direction information. However, in some cases, more information may be needed to derive useful data and analytics pertaining to the asset 100. One example of information that is not typically provided by the telematics device 200 is video capture data. Another example of information that is not typically provided by the telematics device 200 is any proprietary signaling provided by devices which does not follow any of the standard protocols (OBD-II, J1939 or CANOpen). Some equipment may not have a CAN bus and may provide proprietary digital and/or analog signals. Examples of such devices include industrial equipment, winter maintenance equipment such as salt spreaders, farming equipment, and the like. Additionally, the telematics device 200 may not have an NFC module 260 or a short-range wireless communications module 270 thus limiting its connectivity capabilities.

Input/Output Expander

Figure 2B:
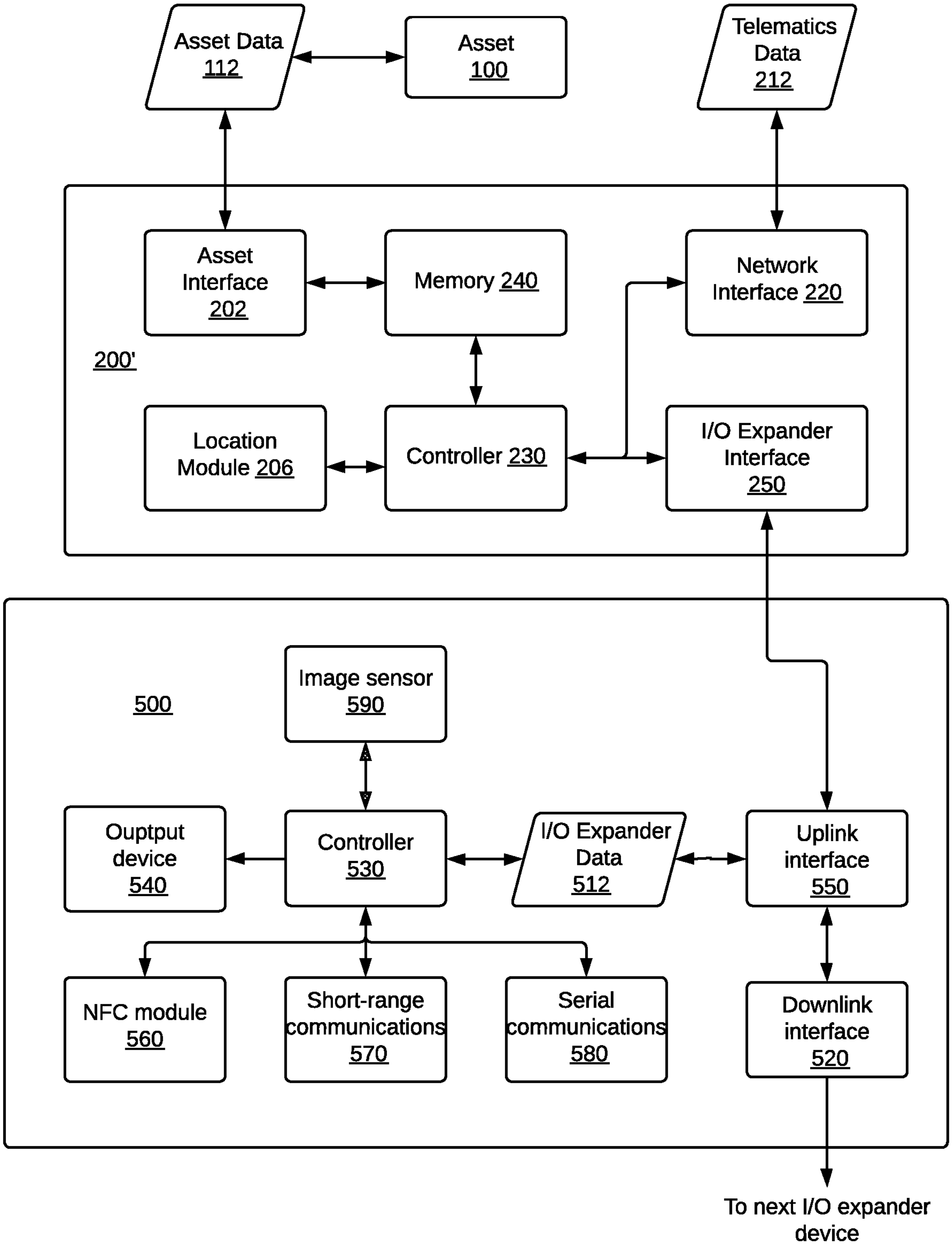
FIG. 2B is a block diagram showing a telematics device coupled to an asset and to an input/output (I/O) expander.

To capture and provide information or services not provided by the asset 100 or the telematics device, to produce an output, or to perform an action not supported by the telematics device, the telematics device 200 may be modified to allow an input/output expander device ("I/O expander") to connect thereto, as shown in FIG. 2B. FIG. 2B shows a telematics device 200' coupled to an asset 100. An I/O expander 500 is coupled to the telematics device 200'.

The asset 100 is similar to the asset 100 of FIG. 2A and therefore the internal components thereof are not shown in FIG. 2B for simplicity.

The telematics device 200' has a somewhat similar configuration as the telematics device 200 of FIG. 2A, but some of the optional components have been removed. Furthermore, the telematics device 200' adds an I/O expander interface 250 for interfacing with the I/O expander 500. The I/O expander interface 250 is coupled to the controller 230 and may be configured for exchanging I/O expander data 512 with the I/O expander 500.

The I/O expander 500 of FIG. 2B is an example I/O expander which is designed to provide additional connectivity options to a telematics device 200, which has more limited features than the one shown in FIG. 2A. For example, the telematics device 200' shown in FIG. 2B does not have an NFC module, a short-range wireless communications module, or a serial communications module. Instead, the telematics device 200' has an I/O expander interface 250.

The I/O expander 500 may be an input device configured to capture additional data such as video frames, audio frames, or proprietary signals and provide that data to the telematics device 200'. Alternatively, or additionally, the I/O expander 500 may be configured as an output device and may include a display for displaying information and/or an audio output device for broadcasting messages pertaining to the asset 100.

An I/O expander 500, which connects with the telematics device 200', varies in complexity depending on the purpose thereof. FIG. 2B shows an I/O expander 500 containing several components which may or may not all be present in other I/O expanders. For example, the I/O expander 500 includes a controller 530, an NFC module 560, an output device 540, a short-range communications module 570, an image sensor (not shown), a serial communications module 580, an uplink interface 550 and a downlink interface 520.

The controller 530 may be similar to the controller 230. In some embodiments, the controller 530 is a microcontroller with versatile I/O capabilities. For example, the controller 530 may be a microcontroller which has a plurality of I/O ports such as general-purpose inputs and outputs (GPIOs), serial ports, analog inputs, and the like. In some embodiments, the controller 530 may have built-in persistent memory such as flash memory on which machine-executable programming instructions for carrying out the functionality of the I/O expander 500 may be stored. In other embodiments, the controller 530 may be coupled to a persistent memory module (not shown) that contains the machine-executable programming instructions for carrying out the functionality of the I/O expander 500. The controller 530 may also have built-in volatile memory, such as random-access memory (RAM) for storing data. Alternatively, the I/O expander 500 may be connected to an external volatile memory for storing data.

The output device 540 receives data from the controller 530 and performs an output function. For example, the output device 540 may include a display for displaying information received from the controller 530. As another example, the output device 540 may include a speech synthesizer and a speaker for displaying audible information received from the controller 530. As yet another example, the output device 540 may be an output interface to a hardware device. For example, the output device 540 may be a motor controller that interfaces to an electric motor.

The NFC module 560, short-range communications module 570, and the serial communications module 580 are similar to the NFC module 260, short-range wireless communications module 270, and the serial communications module 280 described above with reference to FIG. 2A.

The uplink interface 550 is an electronic peripheral interface coupled to the controller 530 and is used to provide data exchange and/or power capabilities to the I/O expander 500. The uplink interface 550 allows the I/O expander 500 to transmit and receive I/O expander data. The uplink interface 550 is configured to use the same protocol and signaling as the I/O expander interface 250 of the telematics device 200'. Accordingly, the I/O expander 500 may exchange the I/O expander data with the telematics device 200'. In some embodiments, the uplink interface 550 may also include power pins connected to corresponding power pins in the I/O expander interface 250, thus allowing the I/O expander 500 to be powered via the telematics device 200'. In other embodiments (not shown), the I/O expander 500 may have its own power source instead of or in addition to the power provided by the telematics device 200' via the uplink interface 550.

The downlink interface 520 is an electronic peripheral interface coupled to the uplink interface 550. The downlink interface 520 is configured to interface with the uplink interface 550 of another I/O expander 500 (as will be described below). Allowing the uplink interface 550 to connect to the downlink interface 520 of another I/O expander 500 allows the daisy chaining of I/O expanders 500.

Integrated Telematics Device

Figure 3:
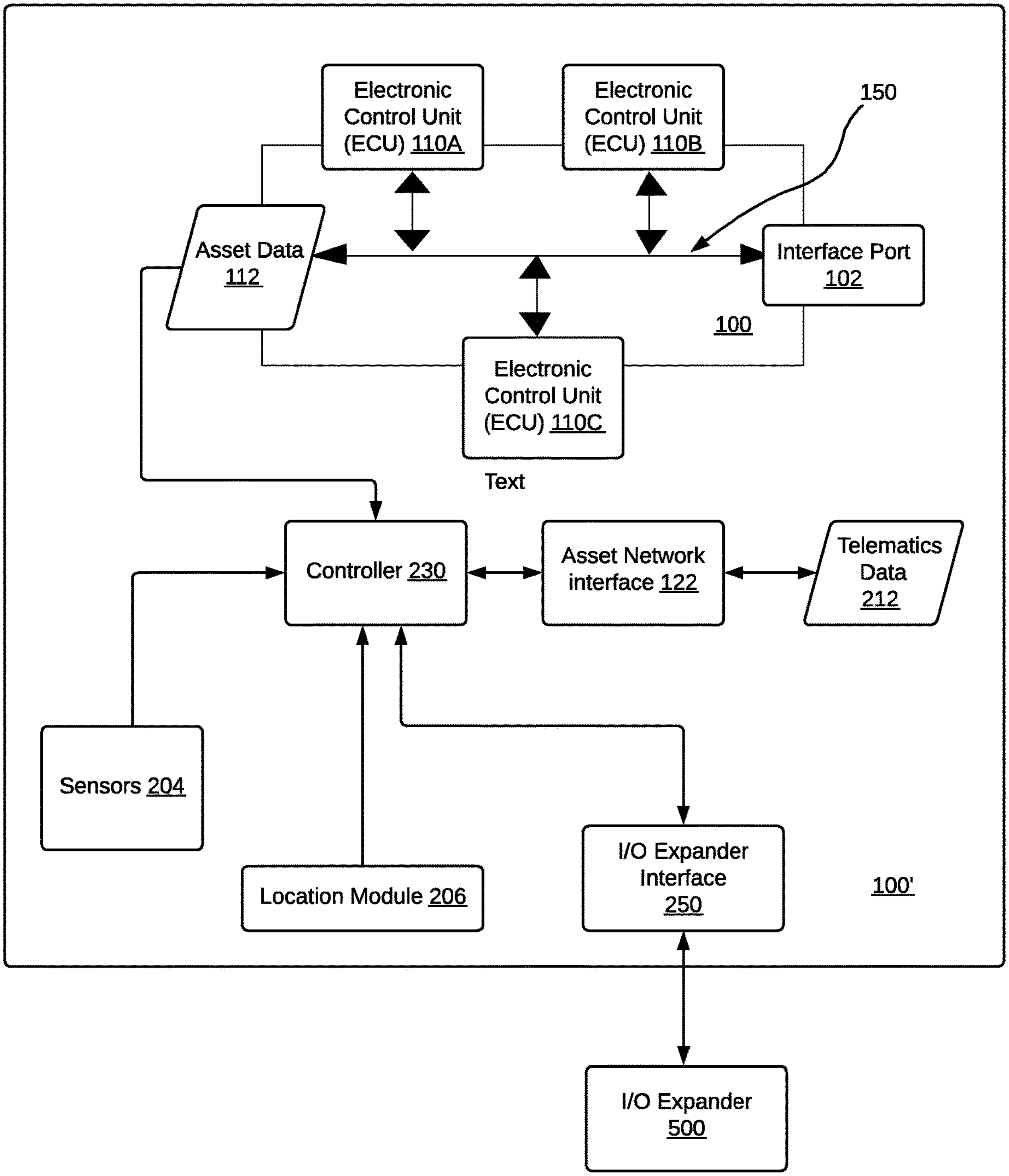
FIG. 3 is a block diagram showing an asset having a telematics device integrated therein and an I/O expander coupled thereto.

In the above-mentioned figures, a telematics device is shown as a separate entity connected with a corresponding asset. The telematics device, however, may have its components integrated into the asset 100 at the time of manufacture of the asset 100. This may be the case when the asset 100 is a connected car having an asset network interface. For example, with reference to FIG. 3, there is shown an asset 100' with the components of a telematics device integrated therein, in accordance with embodiments of the present disclosure. The asset 100' is similar to the asset 100 but, being a connected asset such as a connected car, it has an asset network interface 122. In the depicted embodiment, the controller 230 is directly connected to the asset communications bus, which is a CAN bus 150 and may directly obtain the asset data 112 therefrom. The sensors 204 and the location module 206 are also integrated into the asset 100 and provide the sensor data 205 and the location data 207 to the controller 230 as described above. The asset network interface 122 belongs to the asset 100' and may be used by the asset 100 to communicate with an original equipment manufacturer (OEM) server, to a roadside assistance server, or for other purposes. The controller 230 may utilize the asset network interface 122 for the transmission of telematics data 212 provided by the controller 230. In order to support further not provided by the integrated peripherals such as the sensors 204 and the location module 206, the asset has an I/O expander interface 250 coupled to the controller 230 so that an I/O expander 500 may be connected to the asset 100' therethrough. The asset 100' may have an interface port 102 for connecting other devices other than a telematics device 200, such as a diagnostic tool including, but not limited to, an OBD-II reader device.

Electronic Device Use Restrictions

In some jurisdictions, there are by-laws which restrict the use of an electronic device such as a smartphone or a tablet while behind the wheel of a vehicle and the engine is running. While most vehicle operators may comply with the by-laws, some will not. It is, therefore, advantageous to provide methods and systems for restricting features of a vehicle operator's electronic device.

The present disclosure provides methods and systems for restricting features of an electronic device of a vehicle's operator when the vehicle's operator is behind the wheel and the vehicle's engine is running.

Figure 4:
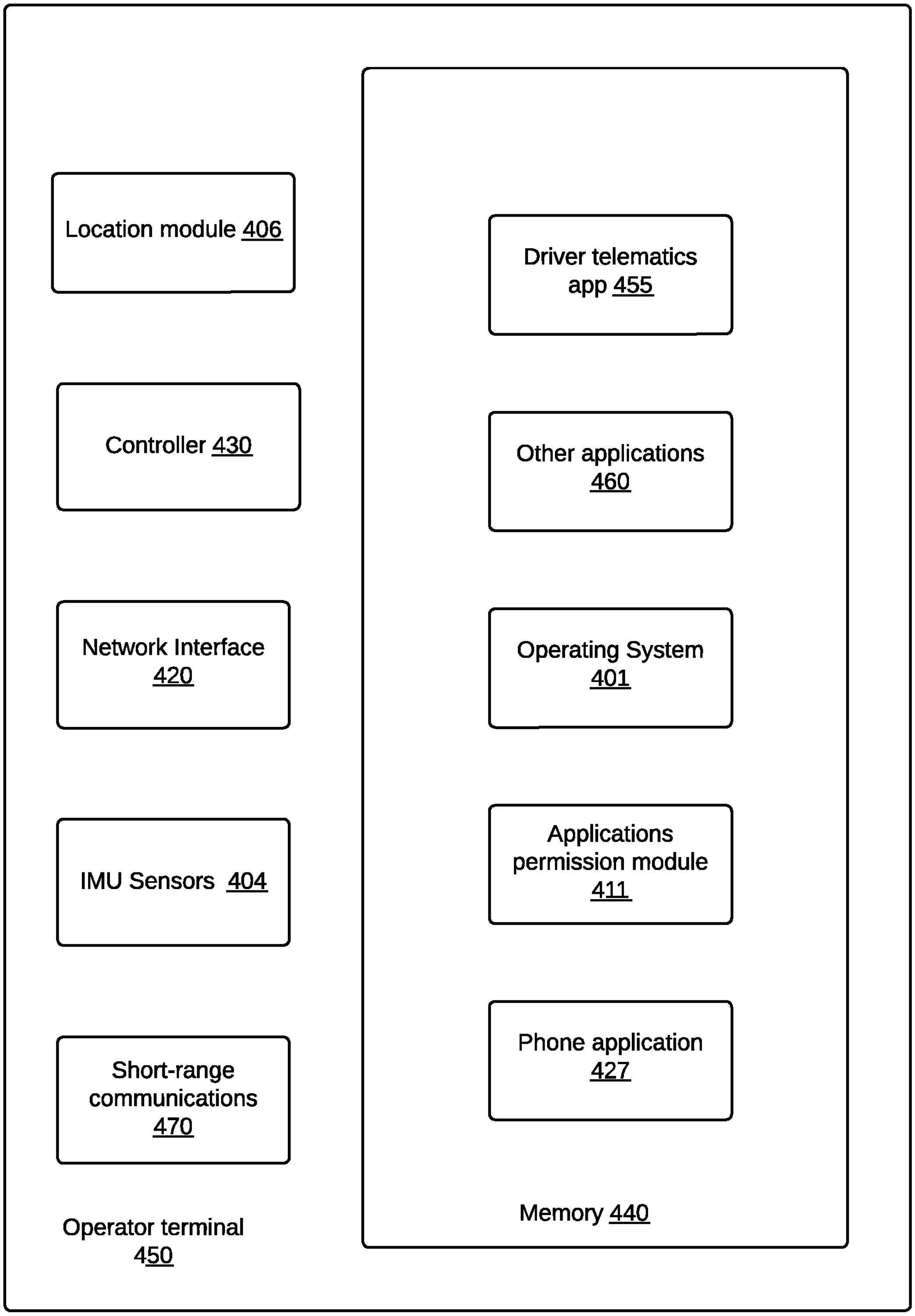
FIG. 4 is a block diagram of an operator terminal, in accordance with embodiments of the present disclosure.

An electronic device may be a smartphone, a tablet, a laptop computer, or the like. FIG. 4 depicts an example of an electronic device in the form of a vehicle operator terminal ("operator terminal") 450, in accordance with embodiments of the present disclosure. The operator terminal 450 comprises a controller 430, a network interface 420 coupled to the controller 430, an IMU 404 comprising one or more sensors coupled to the controller 430, a short-range wireless communications module 470, and a memory 440 coupled to the controller 430.

The controller 430 is similar to the controller 430 of the telematics device 200.

The network interface 420 is similar to the network interface 220 of the telematics device 200 and it enables the operator terminal 450 to communicate with the telematics server 300.

The location module 406 is similar to the location module 206 of the telematics device. The location module 406 reports the location of the operator terminal 450 to the controller 430.

The inertial measurement unit (IMU) 404 may comprise one or more sensors such as accelerometers, gyroscopes, or magnetometers. The IMU 404 provide an indication to the controller 430 as to whether the operator terminal 450 is generally stationary or in motion.

The short-range wireless communications module 470 is a component intended for providing short-range wireless communication capability to the operator terminal 450. The short-range wireless communications module 470 may be a Bluetooth™ wireless fidelity (Wi-Fi), Zigbee™, or any other short-range wireless communications module. The short-range wireless communications module 470 allows the operator terminal to communicate with other devices over a short-range wireless network. For example, the operator terminal 450 may exchange information with a telematics device 200 over a short-range wireless network such as a Bluetooth network.

The memory 440 is similar to the memory 240 of the telematics device 200. The memory 440 stores a number of software or firmware modules including an operating system 401, an applications permission module 411, a phone application 427, a driver telematics application 455, and other applications 460.

The operating system 401 configures the operator terminal for context switching between applications, may include firmware drivers, user interfaces, and other modules. Examples of the operating system 401 include Android, iOS, and Windows Mobile.

The driver telematics application 455 allows a vehicle operator to register with a particular vehicle and report the registration to the telematics server 300. Accordingly, the telematics server 300 may correlate the telematics data 212 collected by the telematics device 200 coupled to the particular vehicle with the vehicle operator.

The phone application 427 allows making telephone calls including emergency calls from the operator terminal 450.

The application permission module 411 may disable certain applications from running based on a command from the operating system 401. In some embodiments, the application permission module 411 may be an integral part of the operating system 401 or a standalone component coupled to the operating system 401.

The other applications 460 may be any type of application such as a calendar, email application, a web browser, a chat program, a social networking application, and the like.

Figure 5:
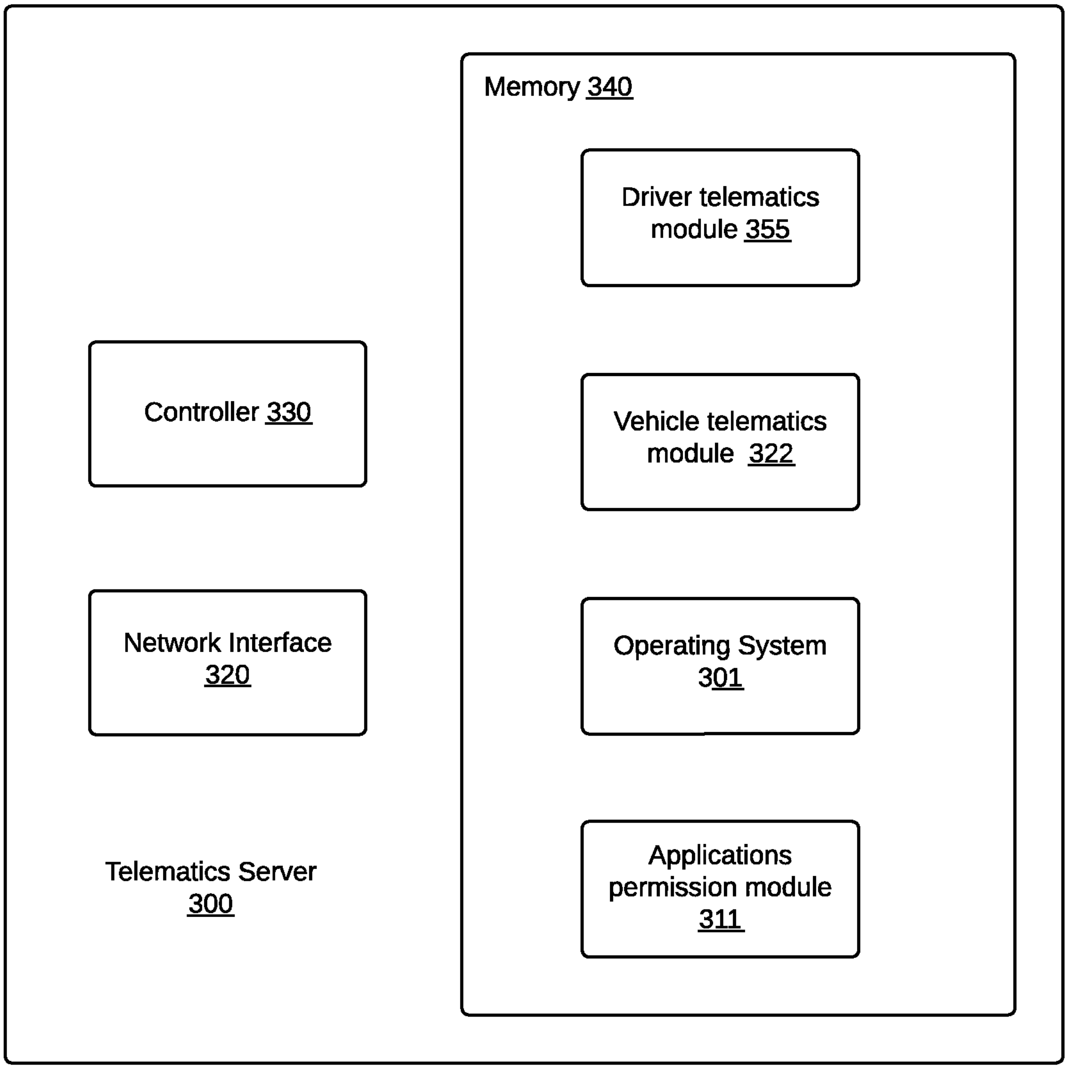
FIG. 5 is a block diagram of a telematics server, in accordance with embodiments of the present disclosure.

A block diagram of the telematics server 300 is shown in FIG. 5. The telematics server 300 includes a controller 330, a network interface 320 and a memory 340. The telematics server 300 may also be coupled to a telematics database 310 as shown in FIG. 1.

The controller 330 is similar to the controllers 230 and 430 discussed above with reference to the telematics device 200, and the operator terminal 450.

The network interface 320 is similar to the network interfaces 220 and 420 discussed above with reference to the telematics device 200, and the operator terminal 450. The network interface 320 allows the telematics server 300 to communicate with both a telematics device 200 and an operator terminal 450 over a network such as the network 50 as shown in FIG. 1.

The memory 340 is similar to the memory 240 and the memory 440 discussed above with reference to the telematics device 200 and the operator terminal 450. The memory 340 stores software modules including the operating system 301, the driver telematics module 355, the vehicle telematics module 322, and the applications permission module 311.

The operating system 301 manages task scheduling and hardware interfacing on the telematics server 300. Examples of the operating system include Unix, Linux, and Windows.

The driver telematics module 355 communicates with one or more operator terminals 450 to gather driver telematics information. The driver telematics information includes a registration of the driver with a particular vehicle, the hours-of-service (HOS) for the driver on the vehicle, as well as information from the operator terminal 450 including location information and IMU data. The driver telematics module 355 may receive the driver telematics information, via the network interface 320, from an operator terminal 450 of a vehicle operator. The registration may include an identifier of the driver and/or an identifier of the operator terminal 450 of the driver. The HOS information may include the start time at which the operator will start to use the vehicle, the estimated end time at which their use of the vehicle is completed, and any breaks in-between. The location information may be the location of the operator terminal 450 as reported by a GPS module disposed in the operator terminal 450. The IMU data may be accelerometer data or other sensor data indicating whether the operator terminal 450 is in motion. The driver telematics module 355 may store the registration information in the telematics database 310. The driver telematics module 355 may also make the gathered driver telematics available to the applications permission module 311 as will be described below.

The vehicle telematics module 322 communicates with one or more telematics devices 200 to gather telematics data 212. The telematics data 212 may be comprised of asset data 112, location data, sensor data, connectivity data, and in some cases I/O expansion data. For example, the asset data of the telematics data may include RPM data indicating whether the vehicle's engine is running. The asset data may also include an indication as to whether a driver's seatbelt is fastened. The location data may include GPS location in the form of a latitude and a longitude, or a location based on a connection to a network. The sensor data may include IMU data. The connectivity data may include the status and identity of devices connected with the telematics device 200. For example, if a device such as the operator terminal 450 is connected to the telematics device via the short-range wireless communications module 270 or the serial communications module 280, then an operator terminal 450 identifier and the status of the connection may form part of the connectivity data received by the vehicle telematics module 322 from the telematics device. The connectivity data may also include an indication of a tap by an NFC tag on the NFC module 260 and a vehicle operator identifier corresponding to the NFC tag. In this case, the vehicle telematics module 322 may forward the vehicle operator identifier and a vehicle identifier (obtained as part of the asset data) to the driver telematics module 355. The indication of the tap may include a timestamp of the tap. The I/O expansion data may include a type of I/O expander 500 connected to the telematics device 200 and the identifier of an operator terminal 450 connected to the I/O expander 500. For example, the I/O expansion data may include the identifier of any operator terminal 450 connected with the short-range communications module 570 and the serial communication module. Alternatively, or additionally, the I/O expansion data may contain the identifier of an NFC tag that was tapped at the NFC module 560. The identifier of the NFC tag may be a vehicle operator identifier corresponding to the NFC tag. The vehicle telematics module 322 may forward the vehicle operator identifier and a vehicle identifier to the driver telematics module 355

Figure 6:
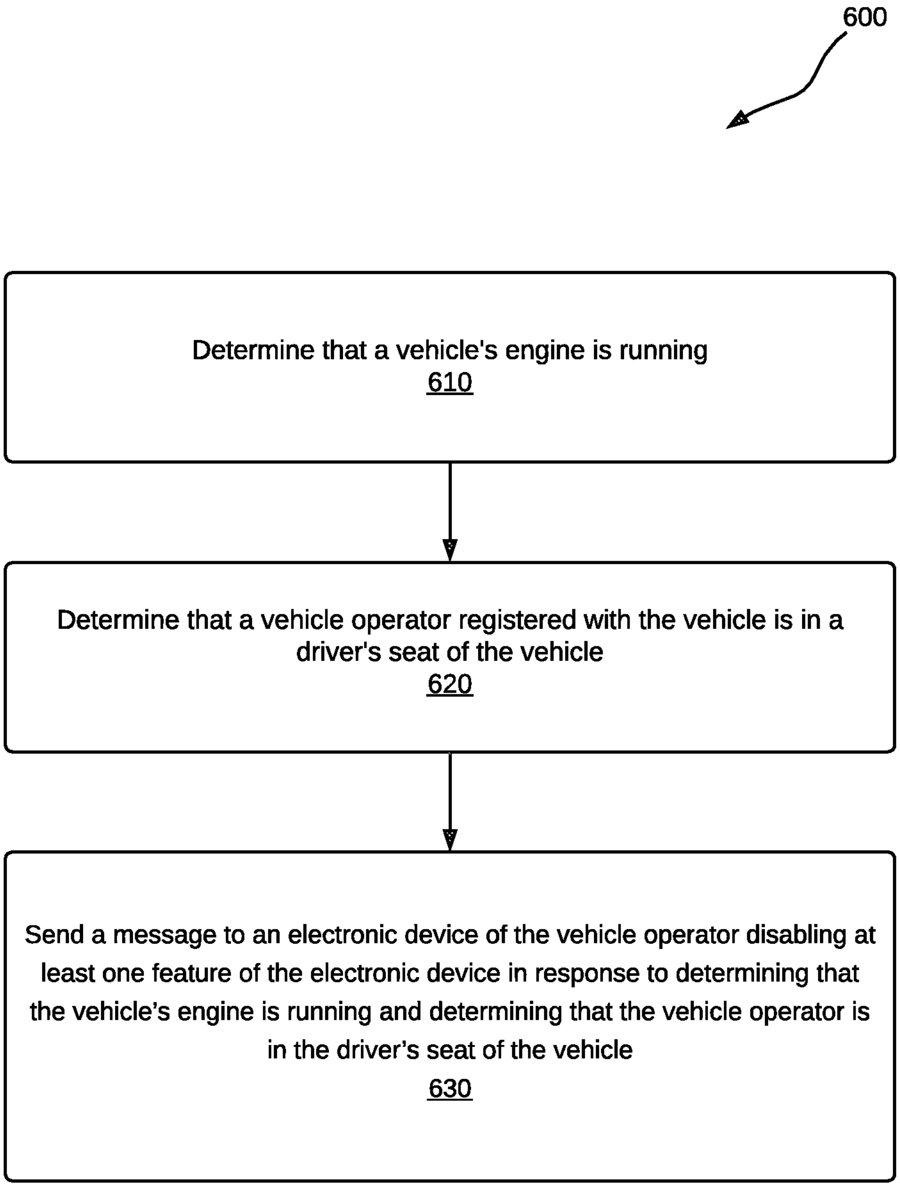
FIG. 6 is a flow chart of a method, by a telematics server, for restricting the use of a vehicle operator's electronic device, in accordance with embodiments of the present disclosure.

The methods and systems for restricting or disabling features of an electronic device, such as an operator terminal, may be performed by a telematics server or by an operator terminal. FIG. 6 depicts a method 600 by a telematics server. At step 610, the telematics server 300 determines that the vehicle's engine is running. In some embodiments, the telematics server 300 determines that the vehicle's engine is running by receiving an indication from a telematics device deployed in the vehicle. The indication that the engine is running may be an RPM which is greater than zero for vehicles including an internal combustion engine or a signal indicating that EV is active for EVs.

At step 620, the telematics server 300 determines that the vehicle operator registered with the vehicle is in the driver's seat of the vehicle.

In some embodiments, determining that the vehicle operator registered with the vehicle is in the driver's seat comprises determining that the current time is within the hours of service (HOS) of the vehicle operator and determining that the electronic device of the vehicle operator is generally stationary. For example, the telematics server 300 may maintain, for example in the telematics database 310, a schedule of the currently registered driver with the vehicle including their HOS. In this case, if the current time is within the driver's HOS and the electronic device of the operator is generally stationary, then it is determined the registered vehicle operator is within the driver's seat.

In other embodiments, determining that the vehicle operator registered with the vehicle is in the driver's seat comprises determining that the current time is within the hours of service (HOS) of the vehicle operator and detecting a presence of an occupant in a driver's seat of the vehicle. Detecting a presence of an occupant in the driver's seat of the vehicle may comprise receiving an indication from a telematics device 200 coupled to the vehicle that the driver's seatbelt is fastened. For example, seatbelts may include sensors that are connected to ECUs that send the sensor status on the CAN bus. The telematics device 200 may read the status of the seatbelt sensor for the driver-side seatbelt and send that information to the telematics server as part of the telematics data 212. In some examples, a driver's seat occupancy sensor (not shown) may be deployed in the vehicle and connected to the telematics device 200 either directly or via an I/O expander. The driver's seat occupancy sensor may send an indication to the telematics device 200 that the driver's seat is occupied. The telematics device 200 may forward the indication to the telematics server 300 for detecting the presence of an occupant in the driver's seat of the vehicle. Additionally, or alternatively, the telematics device may send the indication that the driver's seat is occupied to the operator terminal 450 of the vehicle operator.

In some embodiments, the steering wheel of the vehicle may include one or more hand sensors which detect a vehicle operator's hands. The hand sensors may be in communication with the telematics device 200 either directly or via an I/O expander. The hand sensors may send an indication, to the telematics device 200, that a user's hands are touching the steering wheel thus indicating the presence of an occupant in a driver's seat of the vehicle. In some embodiments, the telematics device 200 may forward the indication to the telematics server 300 for detecting the presence of an occupant in the driver's seat of the vehicle. In some embodiments, the telematics device 200 may forward the indication to an operator terminal 450 of the operator of the vehicle operator. In some embodiments, the indication of the presence of an occupant in the driver's seat is only sent if the hand sensors indicate that the steering wheel was touched within a prior period of time. This excludes cases where the driver has touched the steering wheel briefly then moved away from the vehicle, and thus ensures that only recent interactions with the steering wheel are an indication of the presence of an occupant in the driver's seat. In some embodiments, the presence indication of the presence of an occupant in the driver's seat is only sent if the hand sensors indicate that the steering wheel was touched for at least a particular length of time. This excludes the accidental touching of the steering wheel by a passenger who is not in the driver's seat.

In some embodiments, determining that the vehicle operator registered with the vehicle is in the driver's seat comprises receiving, from a telematics device coupled to the vehicle, an indication that a dashboard camera has captured an image of vehicle operator registered with the vehicle. For example, an I/O expander 500 may have an image sensor 590 in the form of a driver-facing dashboard camera. The telematics device 200 may receive the image of the vehicle operator as I/O expander data 512 from the I/O expander 500 and send it as part of the telematics data 212 sent to the telematics server 300. The telematics server 300 may perform an image recognition method that compares the received image of the vehicle operator with a stored image of the registered vehicle operator for the vehicle.

In some embodiments, determining that the vehicle operator registered with the vehicle is in the driver's seat comprises receiving, from a telematics device coupled to the vehicle, an indication that a fingerprint sensor on a steering wheel of the vehicle has detected the registered vehicle operator's fingerprint on the steering wheel. Similar to other sensors, such as the seatbelt sensor, the fingerprint sensor may send the detected fingerprint over the CAN bus and is captured by the telematics device 200 and sent over to the telematics server 300.

In some embodiments, determining that the vehicle operator registered with the vehicle is in the driver's seat comprises determining that a location of the electronic device of the vehicle operator is in close proximity to a location of the vehicle and determining that the electronic device of the vehicle operator is generally stationary. In some embodiments, determining that the location of the electronic device of the vehicle operator is in close proximity to a location of the vehicle comprises receiving the location of the electronic device from the electronic device, receiving the location of the vehicle from a telematics device deployed in the vehicle, and determining that distance between the location of the electronic device and the location of the vehicle is less than a distance threshold. For example, the location of the electronic device may be received, at the telematics server, from the driver telematics application 455 over the network interface 420 and the network 50. The location of the vehicle may be received from the telematics device 200 as part of the telematics data as discussed above.

In some embodiments, determining that the location of the electronic device of the vehicle operator is in close proximity to a location of the vehicle comprises receiving an indication from the electronic device of the vehicle operator that the electronic device of the vehicle operator is connected to the vehicle via a short-range communications connection. For example, the driver telematics application 455 may query the operating system of the operator terminal 450 and determine that the operator terminal 450 is connected to a vehicle Bluetooth system via a Bluetooth connection. The driver telematics application 455 may send an indication to the telematics server 300 that the operator terminal 450 is connected to the vehicle Bluetooth system. As a result, the telematics server 300 determines that the location of the electronic device of the vehicle operator is in close proximity to the location of the vehicle. As another example, the telematics device 200 may send an indication to the telematics server 300 that the operator terminal 450 is connected to the short-range wireless communications module 270 or that the operator terminal 450 is connected to the short-range communications module 570 of the I/O expander 500. In some embodiments, the operator terminal is connected to the telematics device over a Bluetooth connection. In either case, the telematics server 300 determines that the electronic device of the vehicle operator is in close proximity to the vehicle.

Determining that the location of the electronic device of the vehicle operator is in close proximity to the location of the vehicle may comprise receiving an indication from the telematics device of a near-field communications (NFC) tap by a tag of the vehicle operator within a prior period of time. For example, the vehicle operator may tap an NFC tag on the NFC module 260 of the telematics device or an NFC module 560 on an I/O expander 500. The NFC tap indicates that the vehicle operator is in close proximity to the vehicle at the time of the tap. The tap may be sent to the telematics server 300 by the telematics device 200. The tap may include a unique identifier specific to the vehicle operator. The telematics server 300 may determine that the vehicle operator is in close proximity to the vehicle at the time of the tap and for a period of time thereafter. In some embodiments, the NFC tap may indicate that the vehicle operator is behind the wheel of the vehicle if the NFC tap is not followed by an indication that the vehicle operator has moved.

Determining that the electronic device (e.g., the operator terminal 450) of the vehicle operator is generally stationary may comprise receiving IMU data from the electronic device and determining that the IMU data is below a particular threshold. For example, the IMU data may be accelerometer data. Short-range motion that is detected when the vehicle operator is handling the electronic device is considered below the threshold. The IMU data threshold indicative that the device is not generally stationary may include IMU data that indicates that the vehicle operator is moving distances of a few feet or more. This may indicate that the vehicle operator is walking around the vehicle performing an inspection. In this case, it may not be desirable to disable features on the operator terminal 450 that the vehicle operator may need while performing the inspection. The IMU data may be accelerometer data from a 3-axis accelerometer deployed in the operator terminal 450.

Determining that the electronic device (e.g., the operator terminal 450) of the vehicle operator is generally stationary may comprise receiving IMU data from the electronic device and determining that the IMU data does not match a pattern indicative that the vehicle operator is inspecting the vehicle. For example, the IMU data may represent motion in certain directions. Upon receiving the IMU data from the operator terminal 450, the telematics server 300 may perform some pattern matching against a path around a vehicle indicative of a vehicle operator inspecting the vehicle. For example, the IMU data may be fed into a machine learning model that has been trained with IMU data collected from operator terminals 450 while the vehicle operator was performing an inspection. Accordingly, the ML model may predict, based on input IMU data, whether the vehicle operator may be conducting an inspection around the vehicle.

At step 630, the telematics server 300 sends a message to the electronic device (e.g., the operator terminal 450) of the vehicle operator for changing the configuration of the electronic device in response to determining that the vehicle's engine is running and determining that the vehicle operator is in the driver's seat of the vehicle.

In some embodiments, sending the message for changing the configuration of the electronic device comprises sending a message which causes the electronic device of the vehicle operator to disable all features except for the ability to make an emergency call. In one example, the telematics server 300 sends a message to the driver telematics application 455. The driver telematics application 455 notifies the applications permission module 411, which in turn disables all applications except a phone application 427. Other applications 460 may be disabled. In some examples, the phone application 427 may be disabled except for the ability to make emergency calls.

In some embodiments, changing the configuration of the operator terminal comprises locking a user input peripheral (user interface device) thereof, such as a keypad, a touchpad, or a touchscreen. In other examples, the driver telematics application 455 notifies the operating system 401 of the message for changing the configuration of the operator terminal 450. The operating system 401 may securely lock some user input peripherals, such as the touchscreen, thus causing the user not to be able to use the operator terminal until the password is entered.

In some examples, the telematics server 300 only sends the message for changing the configuration of the operator terminal 450 when the location of the vehicle is outside predetermined geofences. For example, the telematics server 300 may have predetermined geofences defined for the particular vehicle, the geofences each representing a warehouse, an inspection station, or a gas station. In this case, the telematics server 300 first checks if the vehicle is outside such geofences before sending the message that changes the configuration of the operator terminal 450.

In some embodiments, the telematics server 300 does not send a message for changing the configuration of the operator terminal within a grace period that has elapsed since the cranking of the engine. For example, there may be a 2-minute or a 5-minute period during which the operator terminal 450 is not sent a message restricting features thereon. The grace period may start with the cranking of the engine. In some embodiments if the vehicle is in motion or starts moving, the grace period expires.

In some embodiments, the telematics server 300 does not send a message for changing the configuration of the operator terminal unless an image indication received from the vehicle indicates that the vehicle is not at a particular type of location. For example, the vehicle may have a road-facing dashboard camera, in the form of an image sensor 590. The image sensor 590 captures images and the I/O expander 500 sends the captured images to the telematics device as I/O expander data 512. The telematics device 200 may send the captured images to the telematics server 300. The telematics server 300 may compare the captured images with images of certain types of locations such as gas stations and inspection stations. The telematics server 300 may only send a message for changing the configuration of the operator terminal when the vehicle is not a particular type of location such as an inspection station as indicated by the captured image.

In some embodiments, the driver telematics application 455 may allow the enabling or disabling of a particular mode that allows changing the configuration of the operator terminal 450 as described above. For example, the vehicle operator may choose to disable a feature that allows the driver telematics application 455 to receive from the telematics server 300, messages which may change the configuration of the operator terminal 450.

Figure 7:
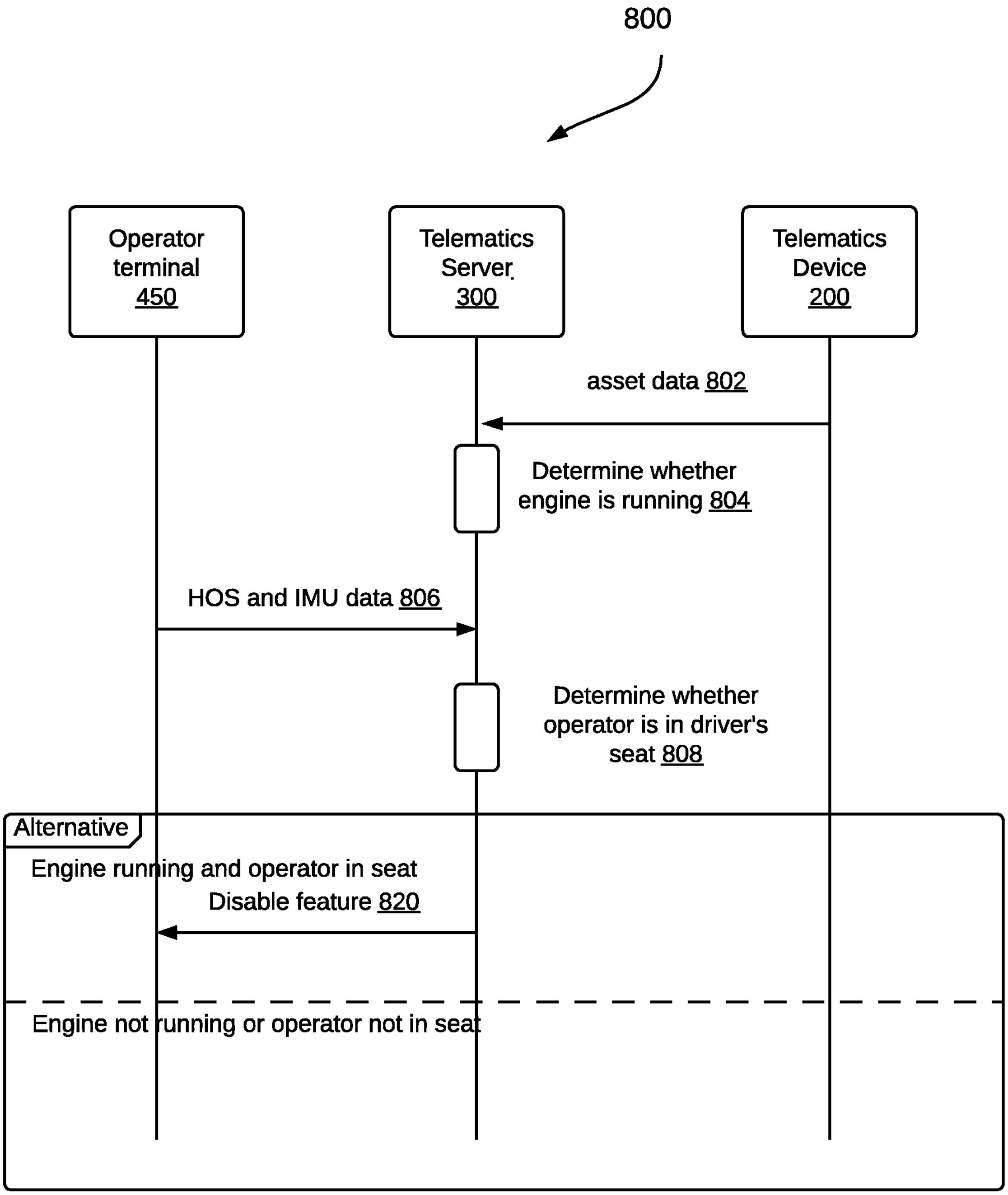
FIG. 7 is a message sequence diagram of a method for restricting the use of a vehicle operator's electronic device, in accordance with embodiments of the present disclosure.

FIG. 7 depicts a sequence diagram 800 of an embodiment of the present disclosure. At step 802, the telematics device provides asset data to the telematics server 300 including an indication that the engine is running, or an EV is active. At step 804, the telematics server determines whether the engine of the vehicle coupled to the telematics device 200 is running. For example, if the asset data contained an RPM on a vehicle with an internal combustion engine (ICE), the telematics server determines that the engine is running if the RPM is above a certain value, such as 0. At step 806, the operator terminal 450 sends the vehicle operator's HOS and the operator terminal's IMU data to the telematics server. At step 808, the telematics server 300 determines whether the operator is in the driver's seat based on the HOS and the IMU data. If the engine is running and the operator is in the driver's seat, then at step 820, the telematics server 300 sends a message to the operator terminal 450 for changing the configuration of the operator terminal 450.

Figure 8:
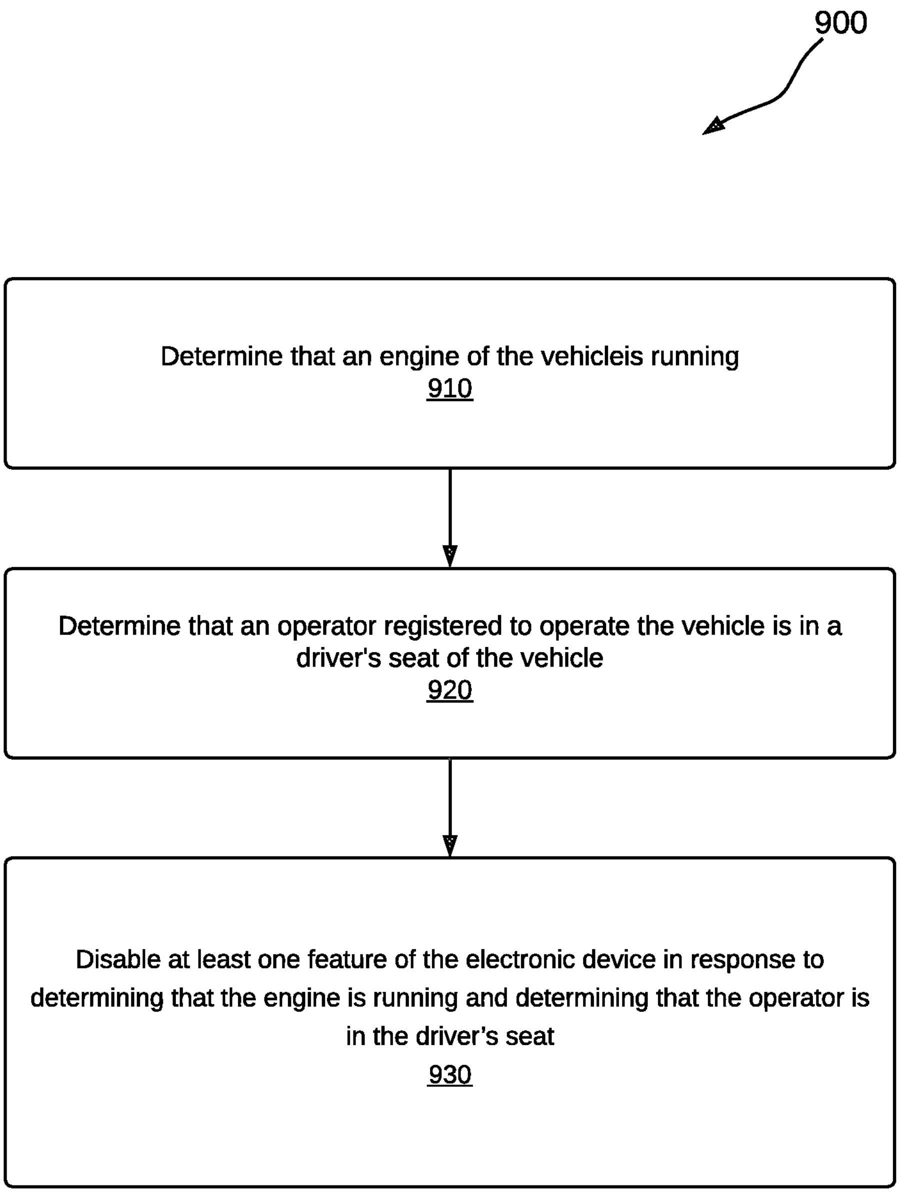
FIG. 8 is a flow chart of a method, by a vehicle operator's electronic device, for restricting the use of the vehicle operator's electronic device, in accordance with embodiments of the present disclosure.

In other embodiments of the present disclosure, FIG. 8 depicts a method 900 performed by an electronic device, such as the operator terminal 450. The method 900 is for changing the configuration of the electronic device. At step 910, the electronic device determines that the engine is running.

In one embodiment, determining that the vehicle's engine is running comprises receiving, over a short-range communications connection, from a telematics device deployed in the vehicle, an indication that the vehicle's engine is running. For example, the operator terminal 450 may be connected, via the short-range wireless communications module 470, to a telematics device 200 via the short-range wireless communications module 270. As another example, the operator terminal may be connected to an I/O expander 500 over the short-range communications module 570 thereof. In either case, the driver telematics application 455 of the operator terminal receives an indication from the telematics device 200 that the engine of the vehicle in which the telematics device 200 is deployed is running.

At step 920, the electronic device determines that the vehicle operator registered with the vehicle is in the driver's seat of the vehicle. In some embodiments, the driver telematics application 455 determines that the vehicle operator is in the driver's seat based on the hours of service (HOS) entered by the vehicle operator and received by a user interface of the driver telematics application 455.

In other embodiments, the operator terminal 450 receives location data from the telematics device 200, the location information indicating the location of the vehicle to which the telematics device 200 is coupled. The operator terminal 450 may receive the location data from the telematics device 200 over a short-range wireless communications connection as discussed above. The operator terminal 450 determines that the operator is in the driver's seat if the operator terminal 450 is in close proximity to the vehicle and the operator terminal 450 is generally stationary (i.e., the operator is not walking around the vehicle performing an inspection, for example). The operator terminal 450 determines that the operator terminal 450 is in close proximity to the vehicle if the location of the operator terminal, as determined by the location module 406 is close to the location of the vehicle received from the telematics device 200. Determining that the location of the operator terminal 450 is close to the location of the vehicle may comprise computing a distance between the two locations and determining that the distance is below a predetermined threshold.

In some embodiments, determining that the operator terminal 450 is generally stationary comprises the driver telematics application 455 reading IMU data from the IMU 404 and comparing the IMU data with a particular threshold. If the IMU data is below the particular threshold, then the movement of the operator terminal 450 indicate that the operator terminal 450 is generally stationary.

In some embodiments, the operator terminal 450 and in particular the driver telematics application 455 may receive, from the telematics device, an indication that the driver's seatbelt is fastened. Accordingly, the operator terminal 450 determines the presence of an occupant in the driver's seat for each of the vehicles as discussed above.

At step 930, the electronic device changes the configuration thereof in response to determining that the vehicle's engine is running, and that the vehicle operator is in the driver's seat of the vehicle. In some embodiments, a driver telematics application may send a message to the operating system of the vehicle operator requesting that certain features be restricted. In some embodiments, a user interface input device, such as a touchscreen or a keypad, is disabled at the operator terminal in response to receiving the message for changing the configuration thereof.

The methods described herein may be performed by machine-executable programming instructions stored in non-transitory computer-readable medium and executable by a controller.

It should be recognized that features and aspects of the various examples provided above can be combined into further examples that also fall within the scope of the present disclosure. The scope of the claims should not be limited by the above examples but should be given the broadest interpretation consistent with the description as a whole.

The invention claimed is:

1. A method, by an operator terminal of an operator registered to operate a vehicle, the method comprising: determining that an engine of the vehicle is running; determining that the operator is in a driver's seat of the vehicle; and disabling at least one feature of the operator terminal in response to determining that the engine is running and determining that the operator is in the driver's seat;

wherein determining that the engine is running comprises receiving an indication from a telematics device coupled to the vehicle that the engine of the vehicle is running; and the method wherein receiving the indication from the telematics device is over a short-range wireless communication connection between the operator terminal and an input/output expander coupled to the telematics device.

2. The method of claim 1, wherein determining that the operator is in the driver's seat comprises: receiving, from a telematics device coupled to the vehicle, a location of the vehicle; determining that a location of the operator terminal is in close proximity to the location of the vehicle; and determining that the operator terminal is generally stationary.

3. The method of claim 2, wherein determining that the location of the operator terminal is in close proximity to the location of the vehicle comprises: computing a distance between the location of the operator terminal and the location of the vehicle; and determining that the distance is below a predetermined threshold.

4. The method of claim 2, wherein determining that the location of the operator terminal is in close proximity to the location of the vehicle comprises receiving an indication from the telematics device of a near-field communications (NFC) tap by a tag of the operator within a prior period of time.

5. The method of claim 2, wherein determining that the operator terminal is generally stationary comprises determining that inertial motion unit (IMU) data from an IMU of the operator terminal is below a particular threshold.

6. The method of claim 1, wherein determining that the operator is in the driver's seat comprises receiving an indication from a telematics device coupled to the vehicle that a driver's seatbelt is fastened.

7. The method of claim 1, wherein determining that the operator is in the driver's seat comprises receiving an indication from a telematics device coupled to the vehicle that an occupancy sensor has detected that the driver's seat is occupied.

8. The method of claim 1, wherein determining that the operator is in the driver's seat comprises receiving an indication from a telematics device coupled to the vehicle that a steering wheel of the vehicle was touched for at least a particular length of time.

9. The method of claim 1, wherein determining that the operator is in the driver's seat is based on hours of service (HOS) received by a user interface of a driver telematics application running on the operator terminal.

10. The method of claim 1, wherein determining that the engine is running comprises receiving an indication from a telematics device coupled to the vehicle that the engine of the vehicle is running.

11. The method of claim 1, wherein determining that the operator is in the driver's seat comprises receiving an indication from a telematics device coupled to the vehicle that a steering wheel of the vehicle was touched within a prior period of time.

12. A method, by an operator terminal of an operator registered to operate a vehicle, the method comprising: determining that an engine of the vehicle is running; determining that the operator is in a driver's seat of the vehicle; and disabling at least one feature of the operator terminal in response to determining that the engine is running and determining that the operator is in the driver's seat; wherein determining that the operator is in the driver's seat is based on hours of service (HOS) received by a user interface of a driver telematics application running on the operator terminal.

13. The method of claim 12, wherein disabling at least one feature of the operator terminal comprises disabling all features of the operator terminal except for an ability to make an emergency call.

14. The method of claim 12, wherein disabling at least one feature of the operator terminal comprises locking a user interface input device thereof.

15. The method of claim 12, wherein disabling at least one feature of the operator terminal comprises disabling certain applications from running.

16. A method, by an operator terminal of an operator registered to operate a vehicle, the method comprising: determining that an engine of the vehicle is running; determining that the operator is in a driver's seat of the vehicle; and disabling at least one feature of the operator terminal in response to determining that the engine is running and determining that the operator is in the driver's seat; wherein determining that the operator is in the driver's seat comprises receiving an indication from a telematics device coupled to the vehicle that a steering wheel of the vehicle was touched within a prior period of time.

* * * * *